US008066267B2

(12) United States Patent
Schaerer

(10) Patent No.: US 8,066,267 B2
(45) Date of Patent: Nov. 29, 2011

(54) PREPPING, SPRAYING AND DRYING RACK SYSTEM FOR DOORS

(76) Inventor: Jake B. Schaerer, San Diego, CA (US)

( * ) Notice: Subject to any disclaimer, the term of this patent is extended or adjusted under 35 U.S.C. 154(b) by 425 days.

(21) Appl. No.: 12/391,205

(22) Filed: Feb. 23, 2009

(65) Prior Publication Data

US 2009/0230066 A1 Sep. 17, 2009

Related U.S. Application Data

(60) Provisional application No. 61/035,726, filed on Mar. 11, 2008.

(51) Int. Cl.
*B23Q 3/00* (2006.01)

(52) U.S. Cl. ............. 269/17; 269/71; 269/296; 254/2 R; 248/130

(58) Field of Classification Search .................... 269/17, 269/47, 285, 296, 71; 248/125.7, 130; 118/500, 118/503; 254/2 R, 2 B, 51
See application file for complete search history.

(56) References Cited

U.S. PATENT DOCUMENTS

| | | | | |
|---|---|---|---|---|
| 1,393,054 | A | 10/1921 | Turner | |
| 2,882,012 | A * | 4/1959 | Luna | 254/133 R |
| 3,306,578 | A * | 2/1967 | Meeks et al. | 254/4 R |
| 3,625,504 | A | 12/1971 | Walker | |
| 3,762,951 | A * | 10/1973 | Hetznecker | 134/16 |
| 4,037,727 | A | 7/1977 | Kunkle | |
| 4,183,511 | A * | 1/1980 | Marek | 269/17 |
| 4,239,197 | A | 12/1980 | Olstad | |
| 4,491,308 | A | 1/1985 | Walton et al. | |
| 5,296,030 | A * | 3/1994 | Young | 118/500 |
| 5,509,544 | A | 4/1996 | Osborn | |
| 5,660,637 | A | 8/1997 | Dodge | |
| 5,662,315 | A * | 9/1997 | Neiss et al. | 269/17 |
| 5,894,945 | A | 4/1999 | Curran | |
| 5,931,320 | A | 8/1999 | Gajda et al. | |
| 6,024,348 | A * | 2/2000 | Ventura et al. | 269/17 |
| 6,090,204 | A | 7/2000 | Speed et al. | |
| 6,173,947 | B1 * | 1/2001 | Johnson | 269/17 |
| 6,338,758 | B1 | 1/2002 | Curran | |
| 6,390,450 | B1 * | 5/2002 | Bressner et al. | 254/4 B |
| 6,412,158 | B1 * | 7/2002 | Moore | 29/249 |
| 6,533,260 | B1 * | 3/2003 | Mock | 269/17 |
| 6,561,470 | B1 | 5/2003 | Gottfredson et al. | |
| 6,572,092 | B2 * | 6/2003 | DuVernay et al. | 269/71 |
| 6,641,668 | B1 | 11/2003 | Edgerton | |
| 6,702,130 | B1 | 3/2004 | Carlilse | |
| 6,875,277 | B1 | 4/2005 | Edgerton | |
| 7,077,365 | B2 | 7/2006 | Vincak | |
| 7,108,144 | B2 | 9/2006 | Goodwin | |
| 7,175,168 | B2 * | 2/2007 | Hardaker et al. | 269/17 |
| 7,243,904 | B1 * | 7/2007 | Grimes | 254/2 B |
| 7,950,626 | B2 * | 5/2011 | Martin | 254/2 R |
| 2005/0284368 | A1 | 12/2005 | Fogg et al. | |
| 2007/0272147 | A1 | 11/2007 | Navarro | |

* cited by examiner

*Primary Examiner* — Lee D Wilson
(74) *Attorney, Agent, or Firm* — George S. Levy

(57) ABSTRACT

A painter rack for supporting one door in a horizontal position during prepping or painting, or at least one door also in a horizontal position during drying. This painter rack comprises two support structures: a left one and a right one; each support structure comprises two vertical members traversed horizontally by a number of openings; each support structure also comprises a number of bars used to support at least one door, each bar is comprised of at least two segments, the first said segment traversing slidably and horizontally an opening, and the second segment is bent with respect the first segment. Each support structure is held in place by a base structure.

20 Claims, 27 Drawing Sheets

PREPPING, SPRAYING AND DRYING RACK SYSTEM FOR DOORS

FIELD OF THE INVENTION

This invention claims the benefit of U.S. Provisional Application No. 61/035,726 with the title, "Prepping, Spraying and Drying Rack for Doors" filed on Mar. 11, 2008 and which is hereby incorporated by reference. Applicant claims priority pursuant to 35 U.S.C. Par 119(e)(i). The present invention relates to racks used to support doors while they are prepped and painted and when they are stacked to dry in a horizontal position. Prepping is defined as activities performed before painting such as sanding and taping.

BACKGROUND

Refinishing doors is time consuming labor. Typically this work involves activities such as sanding, painting, varnishing and drying the door. Placing the door in a vertical position during this work is problematic. Sprayed paint may reach surrounding objects and debris from the floor may foul the wet paint on the door. Wet paint may run down a vertical door creating unsightly tracks. It is more difficult for a painter to work on a vertical door than on a horizontal door.

Ideally doors should be held in a horizontal position while they are being refinished. In addition, both side of the door should be easily exposed to be worked on, and when painted, the wet paint should not be marred by the holding mechanism.

A problem that emerges when multiple doors are painted is that a large surface area is needed to store the doors while they are drying. Therefore, there is a need to store the drying doors in a stack.

Another problem of significance is that freshly painted doors should be allowed to dry in a location removed from the one where doors are sanded and painted to avoid unwanted dust and paint settling on them and marring their surface.

Yet another problem facing the painter is that often he must work on doors of different sizes as when he is working on several assorted cabinets. In addition, doors may have different thicknesses and may have to be handled differently and separately.

U.S. Pat. No. 6,090,204 by Speed et al., does not allow doors of different sizes to be stacked together. In addition, the patent makes use of brackets which may adversely shield some of the door surface from spray paint. Furthermore these brackets cannot be used on thin doors as typically found in cabinets. Insertion of screws on the sides might split the wood.

U.S. Pat. No. 6,561,470 by Gottfredson et al., does not allow doors to be stacked. In addition, anchors inserted on the side of thin doors, strong enough to support the doors during prepping, might split the wood.

U.S. Pat. No. 4,491,308 by Walton et al., does not allow doors of different sizes to be stacked together. In addition the insertion of supporting anchors on the side of thin doors, strong enough to support the doors during prepping might split the wood.

U.S. Pat. No. 4,239,197 by Olstad, U.S. Pat. No. 3,625,504 by Walker and U.S. Pat. No. 2,955,632 by Stone do not allow doors to be stacked. In addition, the insertion of supporting anchors on the side of the doors, strong enough for support during prepping can split the wood if the door is thin.

U.S. Pat. No. 5,509,544 by Osborne does not allow doors of different sizes to be stacked, and cannot be used on thin doors because the supporting anchors might split the wood. In addition this rack system relies on anchors screwed into the edges of doors. These anchors are not strong enough to support doors during heavy duty work such as sanding.

A non-patented device on the market is being sold by the Swiss company Wiederkehr based in Switzerland at Leisibach Strasse, Buchrain 6033 (telephone: 041-445-05-44.) This device is shown in FIG. 1 and FIG. 2. It consists of two racks 101 facing each other. Each rack 101 is traversed at an angle from the horizontal by cylindrical bars 102. These bars can be used to support a stack of doors 106 while the doors are drying. The bars 102 are crimped or flattened on their ends to prevent them from slipping out of the racks. This rack system is not adequate for prepping a door because it supports the door by the edges and not by the surface: the force exerted on a door during prepping may cause the door to slip and fall to the ground. In addition, the bars traverse the vertical members of the rack 101 at an angle from the horizontal, and therefore they cannot be adjusted to support doors of different sizes by sliding them in or out. As shown in FIG. 1 only doors of a single size can be treated simultaneously. The inability of this prior art device to support doors of different sizes is detrimental when cabinets are being refinished because cabinets are usually constructed with non-uniform door sizes even in the same house. For example cabinets in the kitchen may be different depending if they are over or under a counter. Cabinets in the kitchen may differ from those in the bathroom.

None of the prior art offers the functionality, flexibility of use, simplicity and economy of this invention. Further features, aspects, and advantages of the present invention over the prior art will be more fully understood when considered with respect to the following detailed description claims and accompanying drawings.

BRIEF DESCRIPTION OF THE DRAWINGS

FIG. 26 illustrates how a groove can be cut into a support bar, to fit a wedge on the support structure to prevent an upturned bar from rotating during use. In addition a rubber tip can be fitted to the bar to protect the surface of the object being worked on.

SUMMARY OF THE INVENTION

Figure 1:
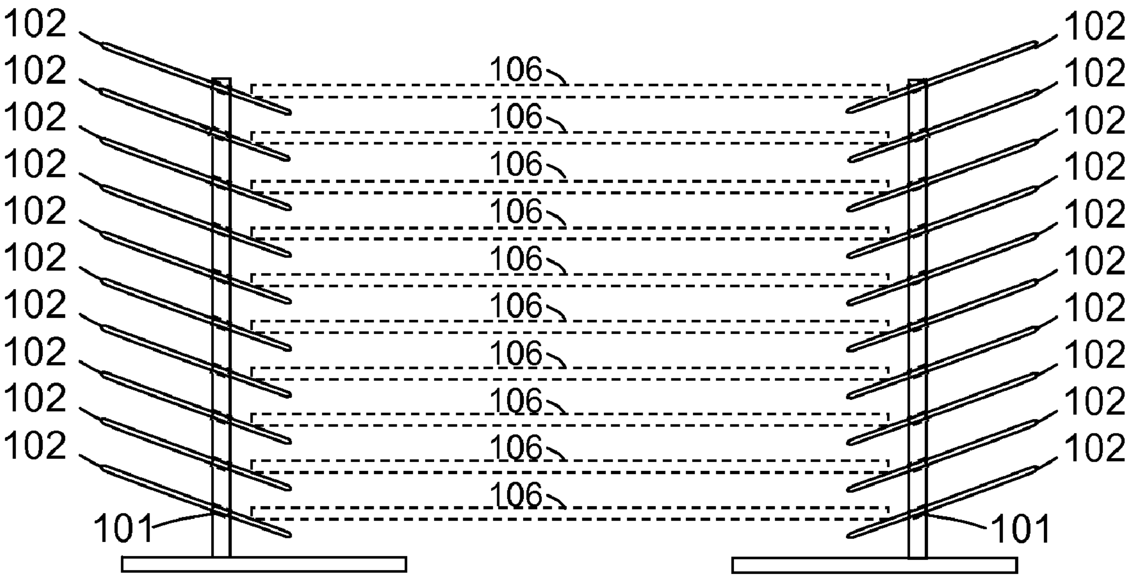
FIG. 1 PRIOR ART
FIG. 1 represents prior art. Supporting bars are independent and traverse the supporting vertical member at an angle from the horizontal.
Figure 2:
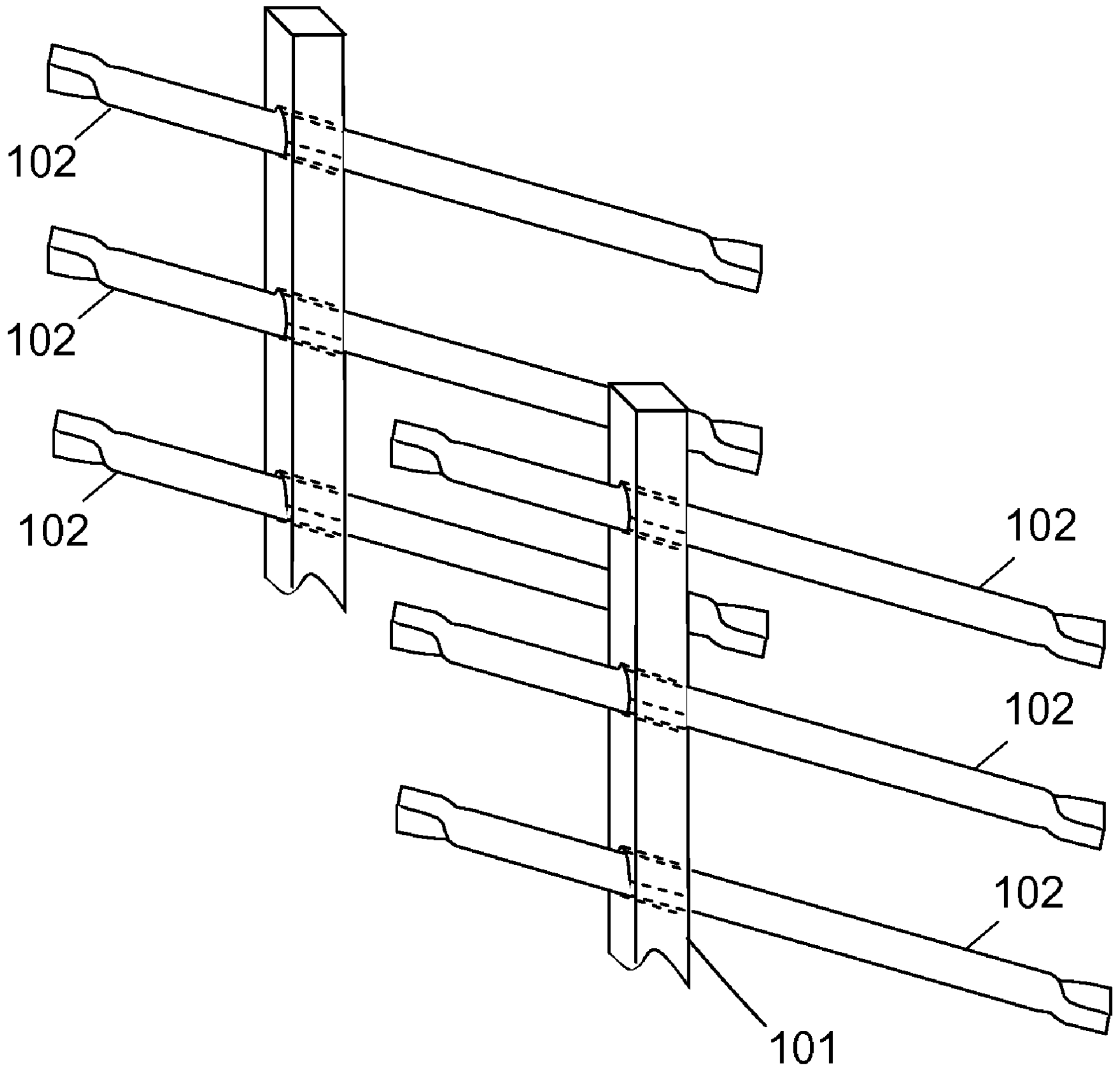
FIG. 2 PRIOR ART
FIG. 2 provides a detailed view of the bars in the prior art.

This invention is a painter rack that can be used in the several phases of refinishing a door, including prepping, painting and drying. It can provide sturdy support with non-damaging contact for one door during the prepping phase. It can also provide sturdy support with minimum contact during the painting phase. Finally it can support a multiplicity of doors in the drying phase. The invention comprises two support structures positioned at each side of the door being refinished. Each support structure comprises two vertical members, each member traversed horizontally by an array of horizontal openings through which bars are slidably inserted. It also comprises a base structure onto which each of the vertical members is affixed.

Each bar is bent in at least two segments. The first segment is horizontal and slidably traversing one of the horizontal openings and can be used to support a door being prepped; the second segment is used to support doors being painted or drying doors. It is bent from the horizontal at an angle ranging from 10 degrees and 45 degrees and more preferably from 20 degrees to 30 degrees.

Doors are deposited on the bars in a horizontal position. In the prepping phase, a door can be deposited on the top level of the rack and are supported by the horizontal section of the bars to maximize stability and minimize marring of the door's surface. In the painting phase a door can be deposited on the top level of the rack and is supported by the slanted edge of the bars to minimize contact with the wet paint coat on the door. In the drying phase a multiplicity of doors can be deposited horizontally on all levels of the rack. In this phase the doors are supported by the slanted segments of the bars to minimize contact with the wet paint.

The bars can slide in and out of the openings in the supporting members to accommodate a diversity of door sizes. Rubber pads can be mounted on the bars to protect the door surfaces or to minimize contact with wet paint.

The cross section of the bars can be made in different shape such as circular, square, rectangular, triangular, diamond and elliptical to minimize various criteria such as manufacturing costs, contact area with the wet paint, mechanical strength, weight, stability (prevent their ability to rotate on their openings) etc. . . . .

Indentation can be formed on the doors to prevent the doors from sliding through the openings in the supporting members.

The bars can be given essentially a U shape to simplify their handling when they are inserted in the openings of the supporting members, and when they are adjusted to support doors of different sizes.

A platform and a hook can be placed on the supporting structure as a convenience to the painter to deposit his tools.

An additional horizontal segment can be added to the bars as a means for increasing stability in case the door being prepped or painted slides on the slanted segments of the supporting bars. The supporting bar would then acquire the shape of an elongated Z with obtuse angles.

The point of contact between the bars and the door can be controlled by giving the slanted segments of the bars an edge with a predetermined curvature. This curvature could range from 0.005 inches to 0.020 inches. Additionally A-roofed pads can be snapped on the bars to achieve the desired curvature.

The support structures can be made more stable by joining them with a telescoping tube or with a cable.

DETAILED DESCRIPTION

Figure 3:
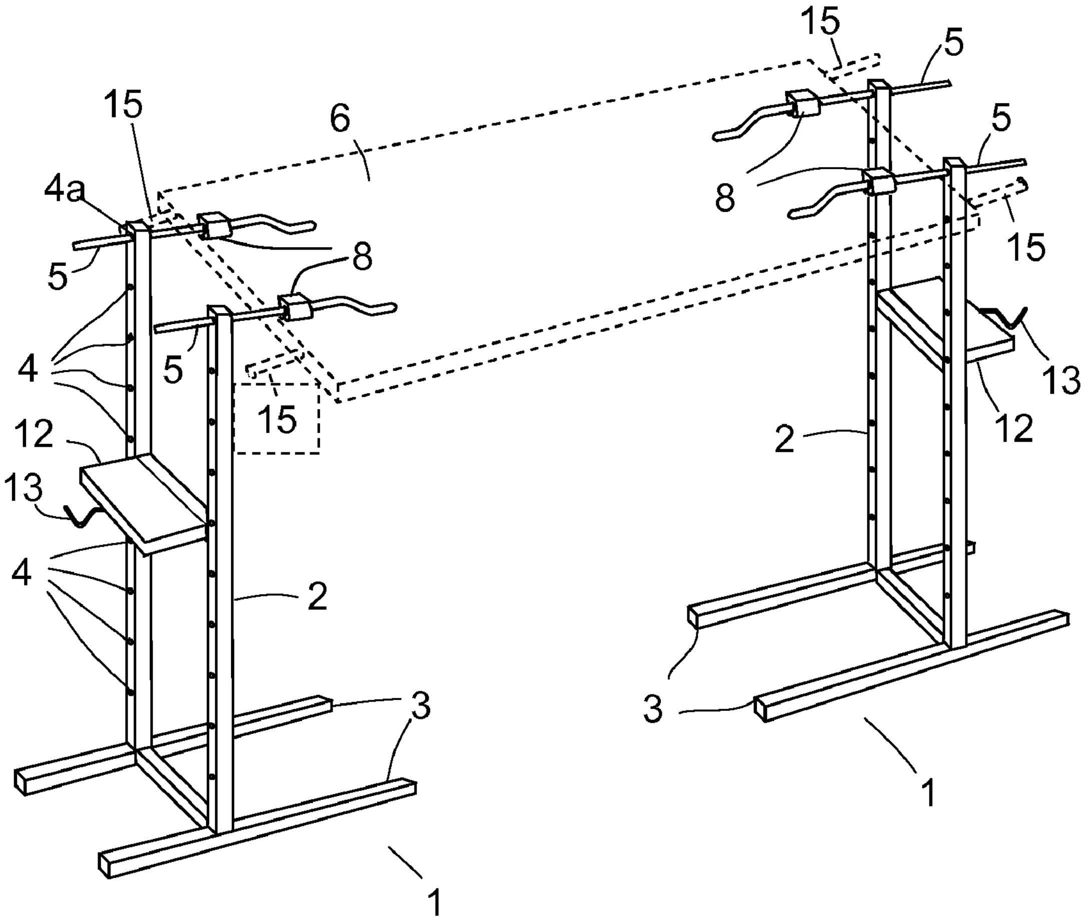
FIG. 3 illustrates the invention used for prepping a door. Bars supporting the door are inserted at the top level of the rack. The door is supported by the horizontal segments of the bars. The bars optionally carry pads made of material such as rubber to prevent slippage.
Figure 4:
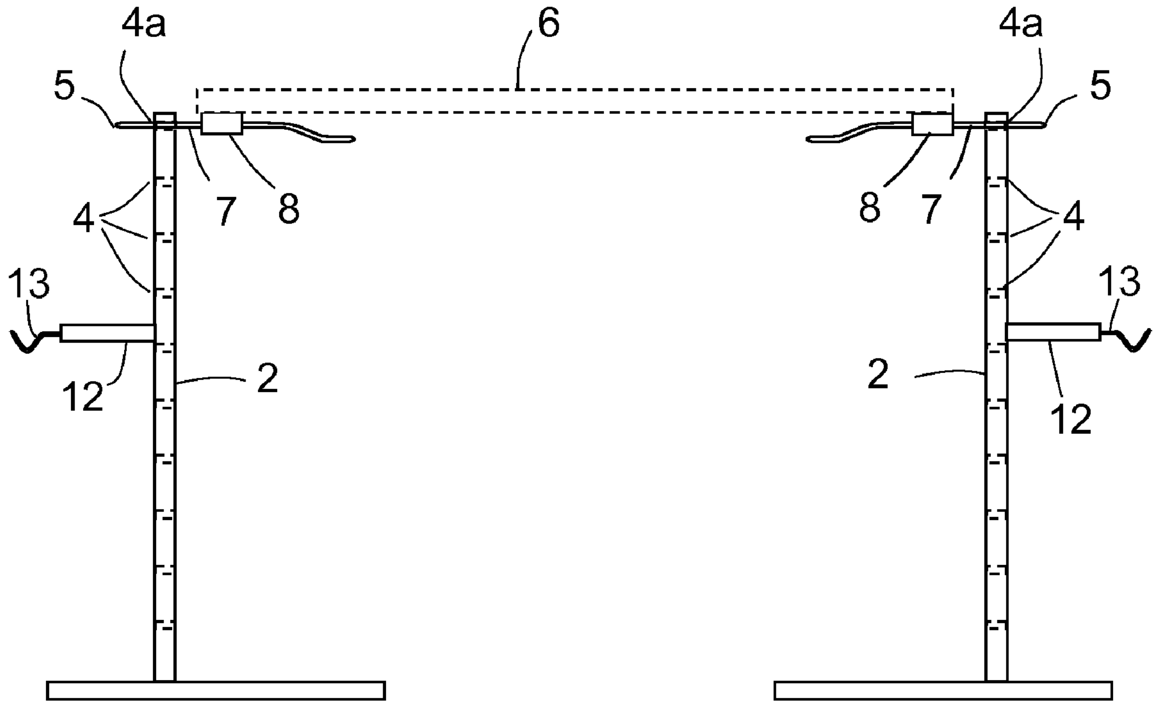
FIG. 4 shows a side view of the device being used to prep a door. Pads on the supporting bars are optional.
Figure 5A:
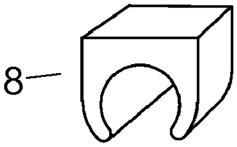
FIG. 5A illustrates a rubber pad which can be mounted on the bars to protect the door finish.
Figure 5:
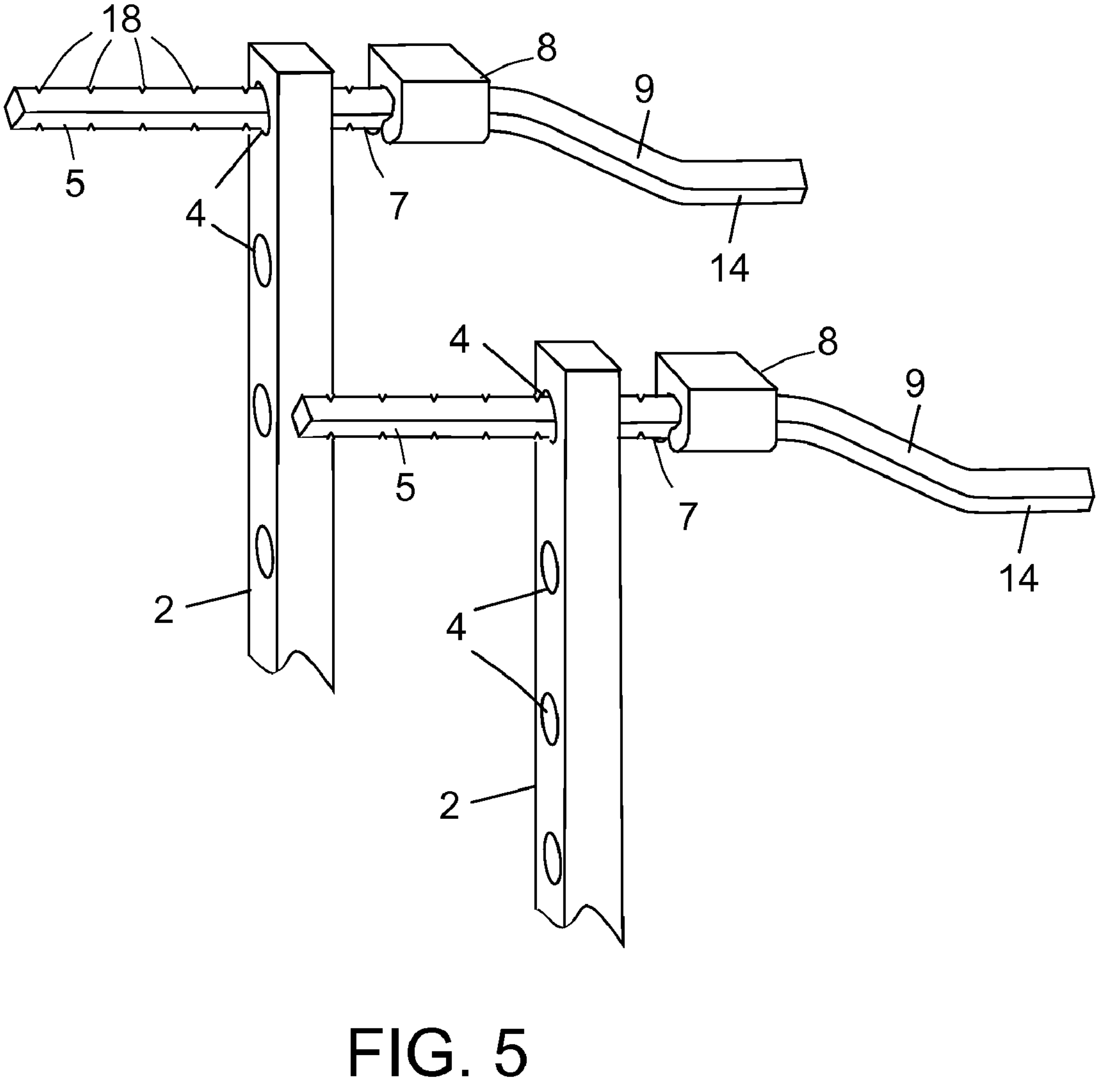
FIG. 5 provides a close up view of the bars in FIG. 3.

This invention can be used for the prepping, spraying and drying of flat objects such as doors, cabinet panels, cabinet doors, and window shutters. FIG. 3, FIG. 4 and FIG. 5 illustrate the invention being used for a door being prepped.

Essentially it consists of a rack comprising two supporting structures 1 facing each other. Each supporting structure 1 includes a pair of vertical members 2 joined together and held erect by a base structure 3. The vertical members 2 are traversed by a series of substantially horizontal openings 4 and 4*a* through which bars 5 are inserted. FIG. 4 is a side view of the painter's rack system. FIG. 5 provides a close up view of the bars 5 which may have a square cross-section as shown in the figure. The bars are inserted such that one of their edges faces upward. The door or object which is to be worked on is supported by the bars. As discussed below providing bars with a square cross section is only one of many possible alternatives.

The bars 5 comprise at least two sections. The first segment 7 is inserted through the openings 4 and 4*a* in the vertical members 2, and is horizontal. The second segment 9 is bent with respect the first segment 7, that is it is at an angle with respect the first segment 7, and can be used to support a door during drying as shall be explained in greater detail below.

During prepping (for example, sanding), significant forces can be exerted on a door. For this task the door is best supported by the horizontal segments 7 of the bars 5 to maximize stability.

As shown in FIG. 5 optional pads 8 made of material such as rubber can be snapped or slid on the bars 5 to protect the surface of the door from damage during prepping work. The pads 8 can have a flat top or can be tubular. FIG. 5A provides a close up view of the snap-on pad 8.

The horizontal segment 7 of the bar which traverses the vertical member 2 is notched with regularly spaced indentations 18 to prevent sliding of the bar through the openings in the vertical members during intensive prepping work. These indentations 18 latch on the walls of the vertical members 2 which are tubular. These indentations 18 also allow the worker to quickly slide the bar 5 to the required extension to support a particular door.

Figure 6:
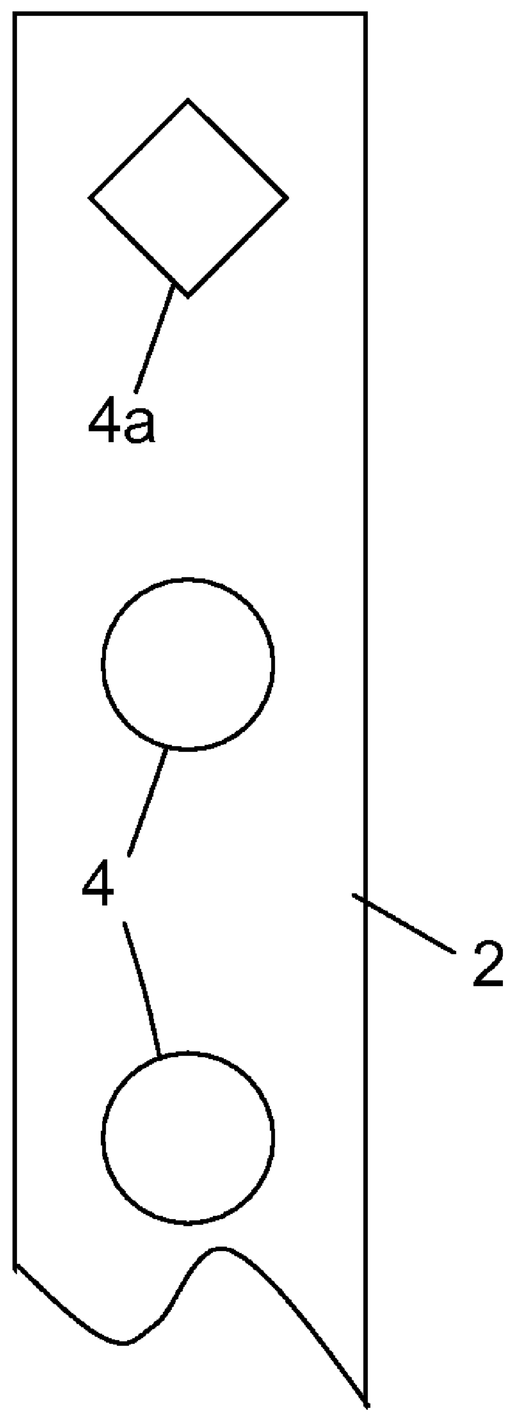
FIG. 6 provides a close up view of the holes in the vertical members of FIG. 3.

FIG. 6 illustrates how the holes through the vertical members 2 can be configured to prevent the bars 5 from rotating during prepping work. The hole 4*a* on the top of a vertical member 2 can be given a non-circular shape. The bar 5 going through that hole would then have a matching but slightly smaller cross-sectional shape with sufficient clearance between the opening 4*a* and the bar 5 to allow the bar to slide snugly but not in the opening. If for example, as shown if FIG. 6, this shape is a square 4*a*, this square can be oriented such that one of its vertices is pointing upward. The bottom holes 4 which are used for drying can be circular to minimize manufacturing cost.

To provide an additional element of stability the bars can be made to comprise three segments wherein the third segment is parallel with the first segment, thereby giving said bar the shape of an elongated Z with obtuse angles.

Figure 7:
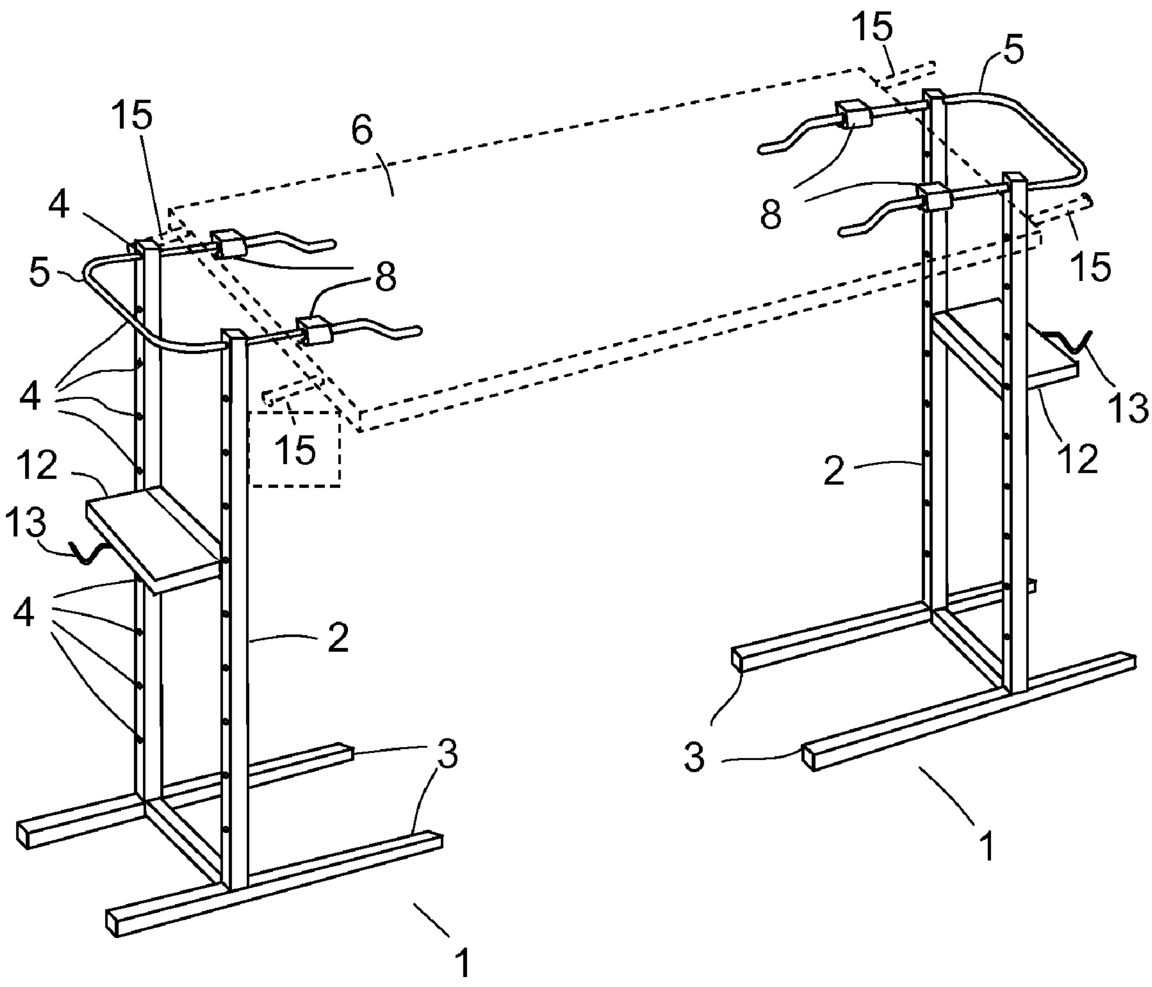
FIG. 7 depicts a variation of the concept shown in FIG. 3 in which the bars are joined in a U shape.
Figure 8A:
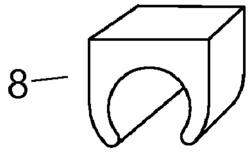
FIG. 8A provides a detailed view of the pad used in FIG. 7.
Figure 8:
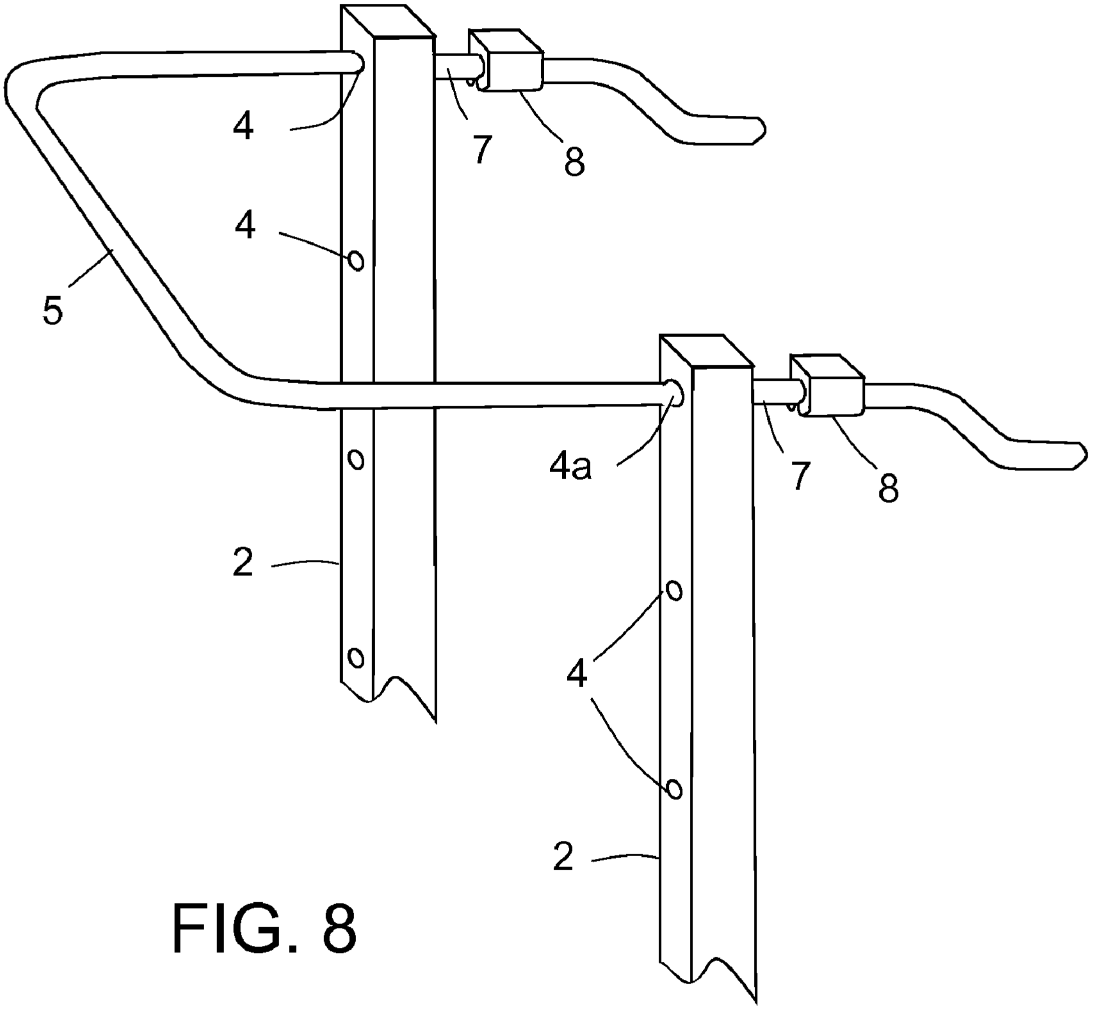
FIG. 8 shows a detailed view of the U-shaped bars of FIG. 7.

FIG. 7 and FIG. 8 provide an alternative design in which the bars 5 are joined together to form a U. Essentially, the first segment of two bars in a bar pair are extended, bent and joined together, essentially transforming two of the bars into a single U shape object. The advantage of the U shape is that the insertion of the bars 5 into the openings 4 and 4*a* and the adjustment of the bars 5 can be made more rapidly since they are attached in pairs. In addition precautions such as square holes 4*a* shown in FIG. 6 to prevent the bars from rotating become unnecessary.

Optionally a platform 12 can be mounted between the vertical elements 2 to provide a work area for the worker to put his tools. In addition, a hook 13 can be mounted on the work platform 12 to allow the painter to hang his spray paint gun. By joining the two vertical members 2, this platform 12 provides additional strength to the overall structure.

Figure 9:
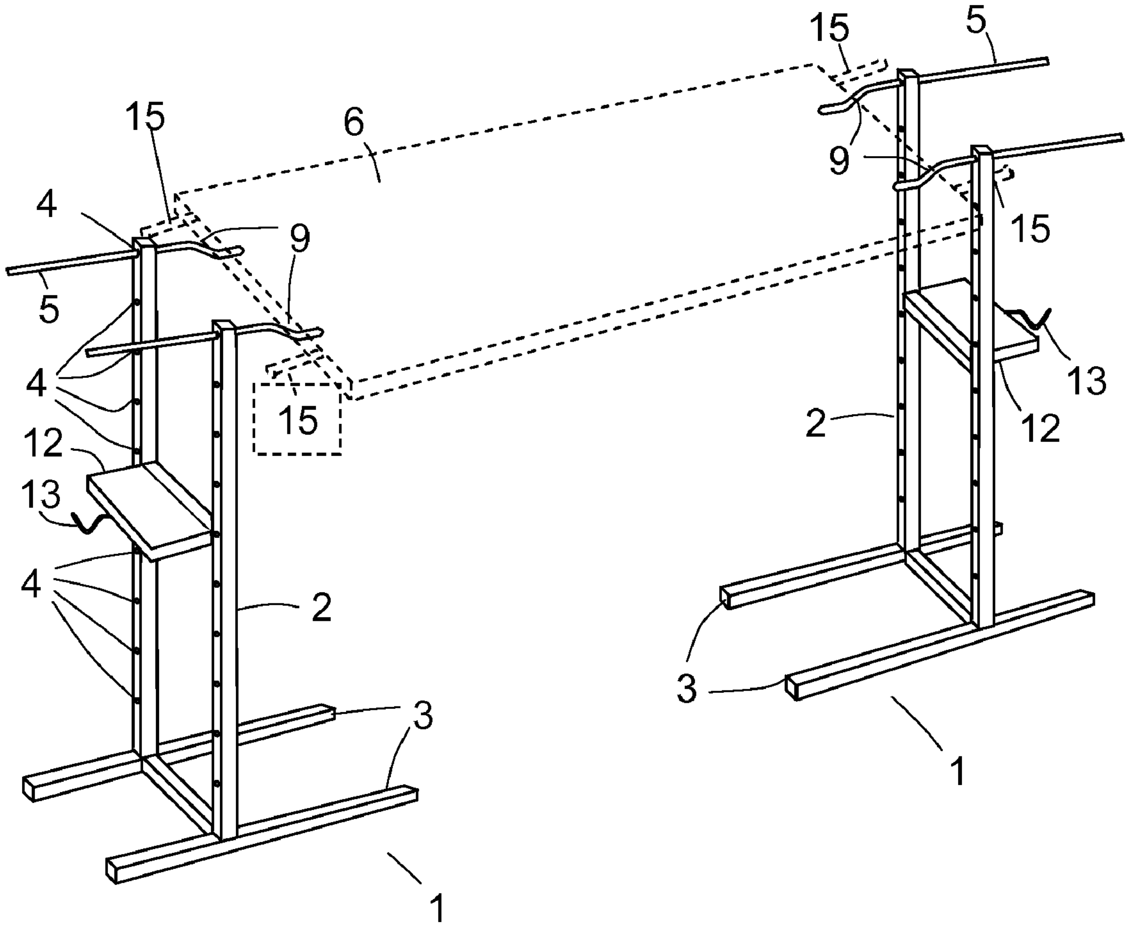
FIG. 9 illustrates the configuration of the device when it is used to spray a door. Bars supporting the door are inserted at the top level of the rack. The door is supported by the inclined segments of the bars.
Figure 10:
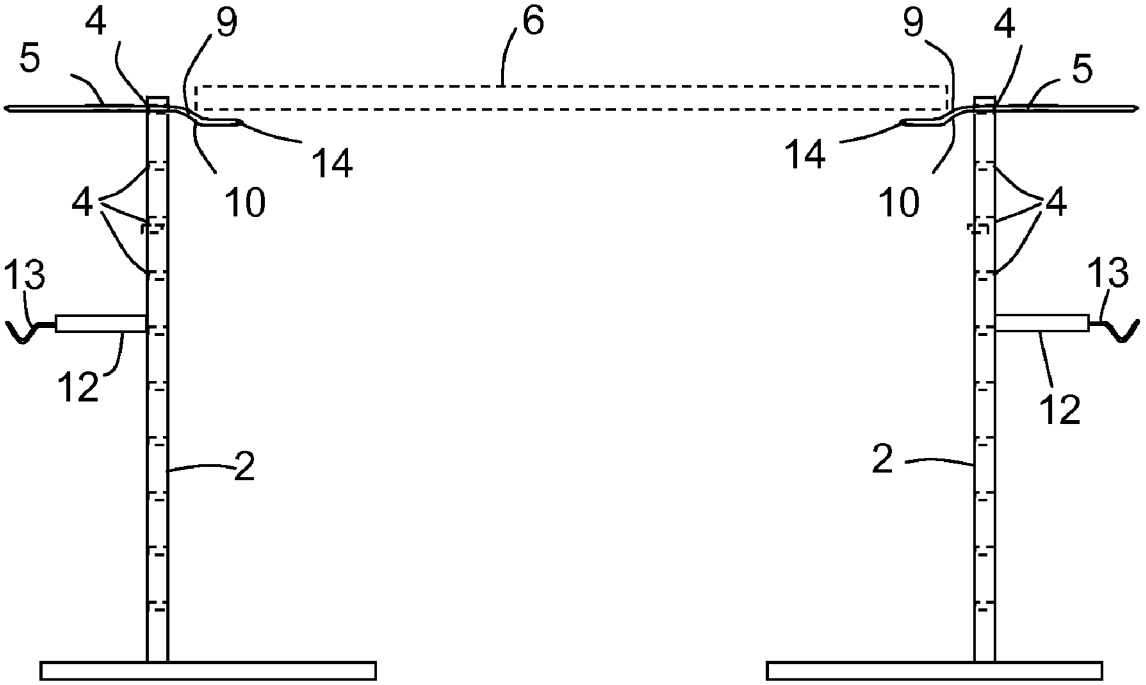
FIG. 10 shows a side view of the device in the configuration being used to spray a door.
Figure 11:
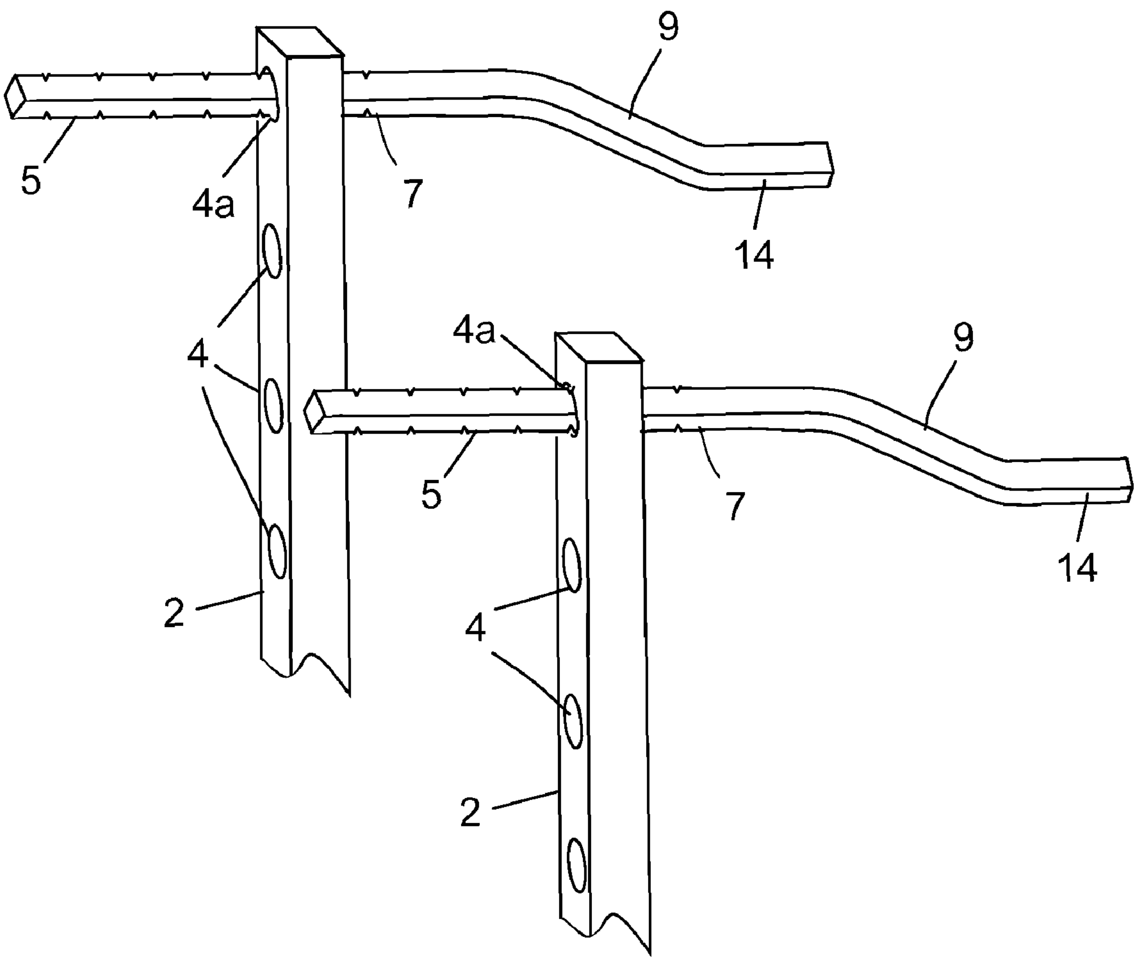
FIG. 11 provides a close up view of the bars in the configuration used to spray doors. A-roofed pads are not necessary since one of the edges of the square cross-section bars is used to minimize contact with the wet door.

FIG. 9, FIG. 10 and FIG. 11 illustrate the configuration of the painter's rack for a door 6 being sprayed. For this task it is preferable to hold the door 6 by the corners of its edges to ensure that the paint reaches all parts of the surface and that the wet paint is not marred by the supporting surface. To this goal, it is advantageous to use the segments 9 of the bars which are slanted from the horizontal. FIG. 10 provides a side view of the painter's rack and FIG. 11 is a close up view of the bars 5. Note that, because of the square cross-section of the bars, no pad is needed to minimize the contact surface with the door's edge.

As shown in FIG. 5 a third segment 14 can be added to the bars 5. This third segment 14 is parallel with said first segment 7, that is it is horizontal, and gives the bar the shape of an elongated Z with obtuse angle. The purpose of this segment 14 is to catch the door 6 before it falls on the floor if the distance between the supporting structures 1 increases because to the forces acting on the structure during prepping.

The slope angle of the segment 9 ranges from 10 degrees to 45 degrees from the horizontal. It should be steep enough to minimize contact with the wet door surface yet not so steep that the door 6 slips down the slope. Preferably it should range from 20 to 30 degrees.

Figure 12:
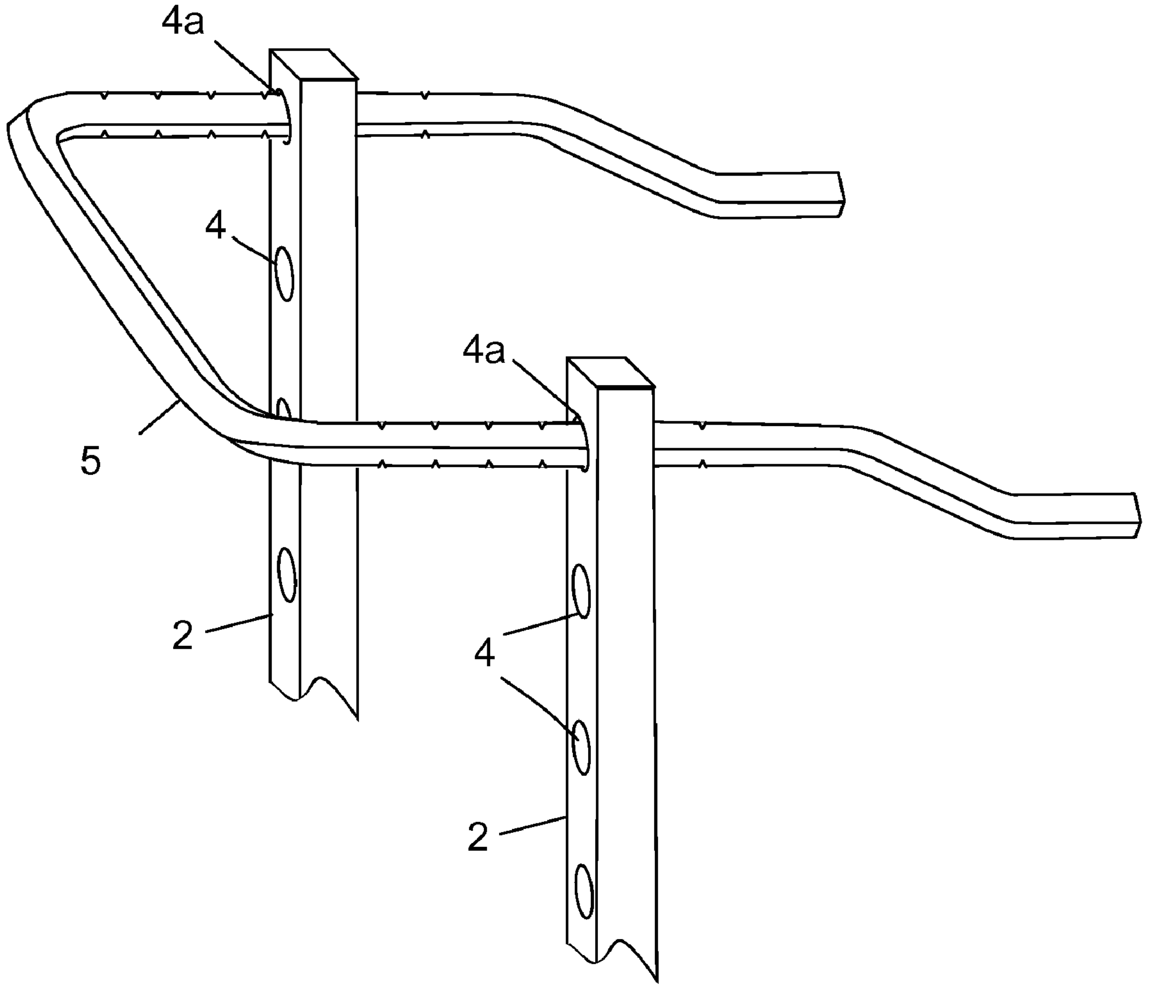
FIG. 12 depicts a variation of the concept in FIG. 11 where the bars are joined together in a U shape.

FIG. 12 is an optional design of the bars in which bars traversing the vertical members 2 are joined together in a U shape. No pads are needed because the edge of the square-cross-section bar can minimize the contact area with the wet door.

Figure 13:
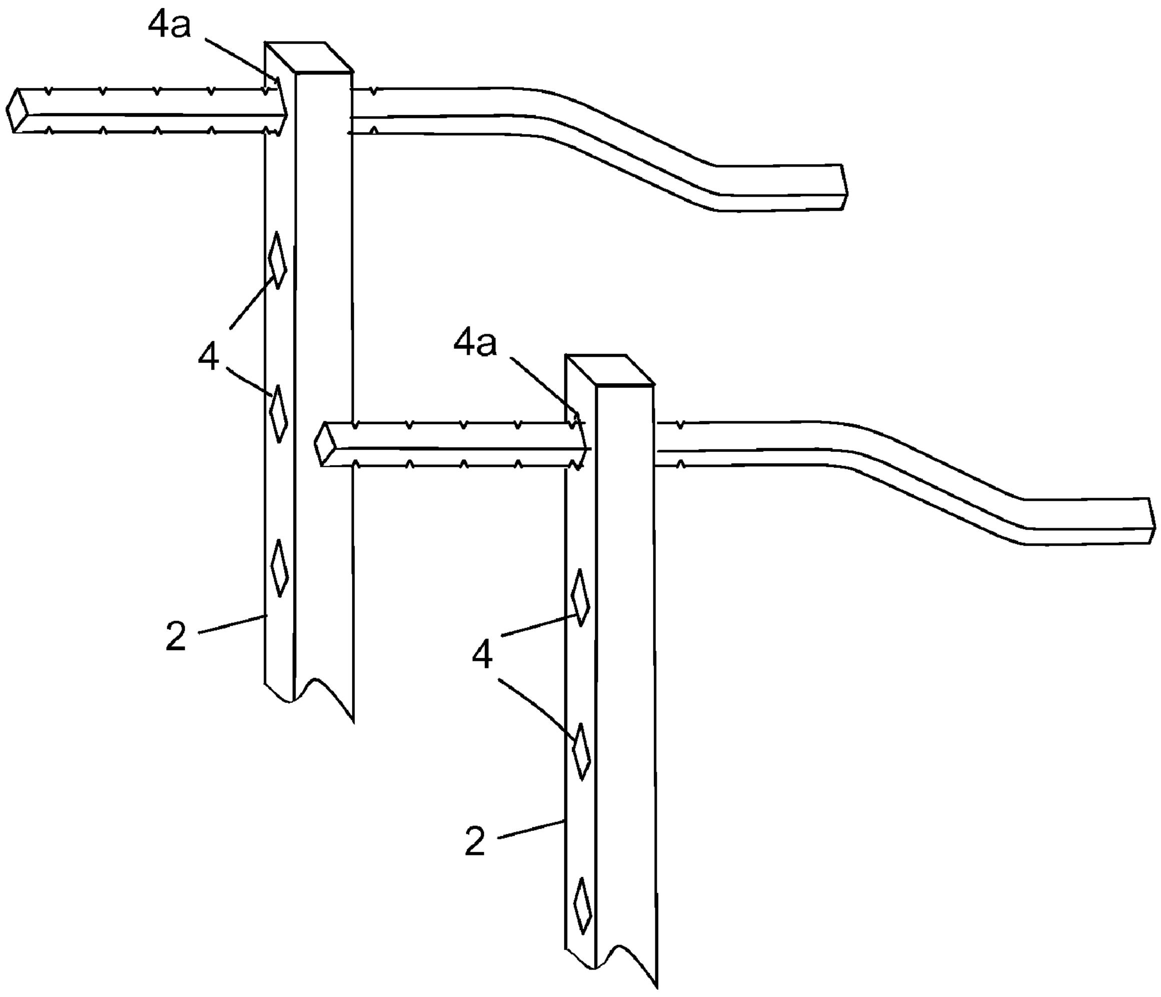
FIG. 13 illustrates another variation of the concept in FIG. 11, in which the circular holes through which the bars are passing are replaced by square holes.

FIG. 13 provides yet another variation in which the holes 4 in the vertical members 2 are diamond shaped, (essentially, square with one diagonal in the vertical plane and the other, in the horizontal plane). More generally, shapes such as square, rectangle, triangular, and diamond, and bars with matching cross-sectional shapes can be used. The selected shape has to present on its top section a sharp edge to minimize the contact area with the supported door. Shapes such as circles and ellipses can also be used if their radius of curvature on their upper surface is acceptable. Curvatures on the upper surface of supporting bars ranging from 0.005 inches to 0.020 inches are sharp enough that they present an acceptably small area of contact with the door and large enough that they do not cut into the door.

Figure 14A:
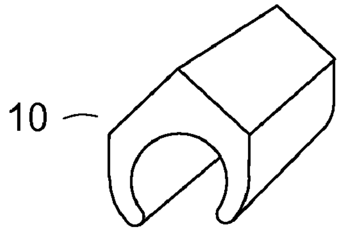
FIG. 14A show a detailed view of an A-roofed pad.
Figure 14:
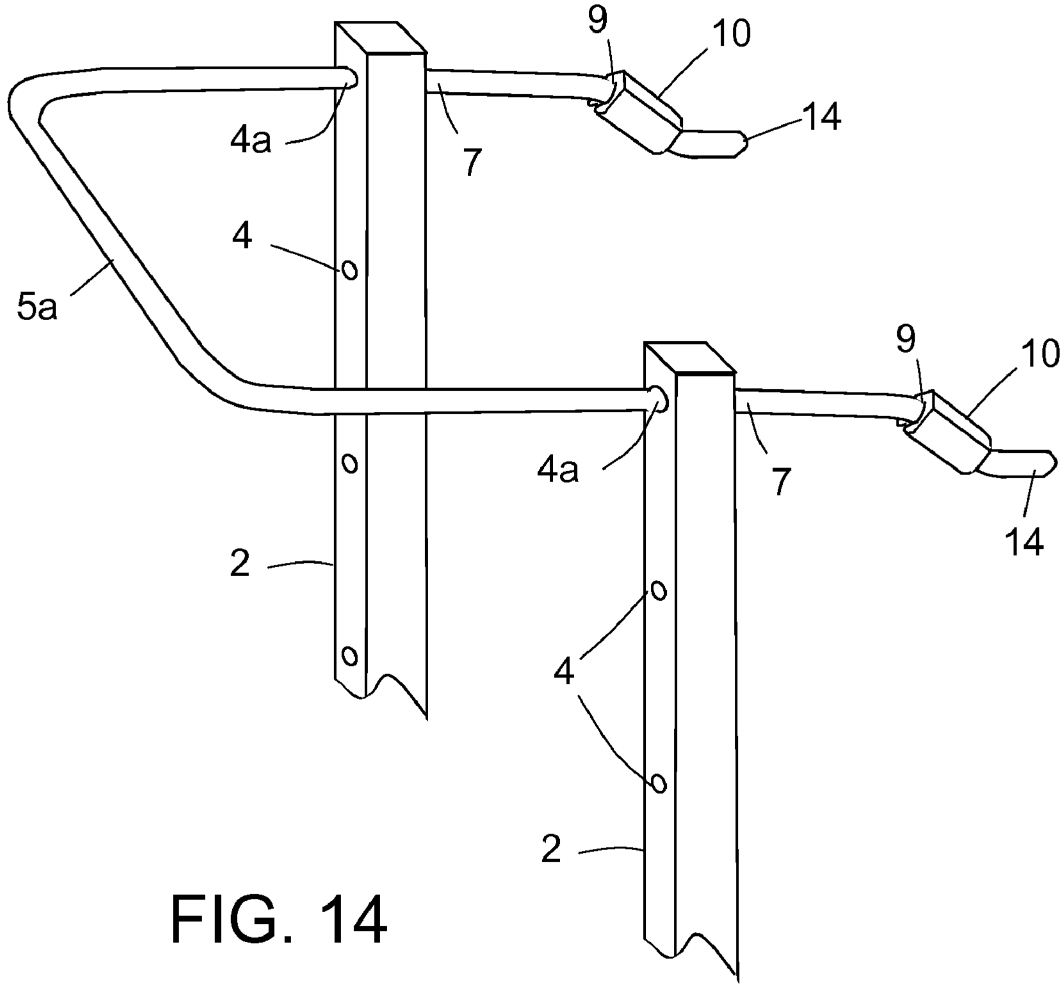
FIG. 14 shows yet another variation of the concept in FIG. 11 in which the square cross-section bars are replaced by bars with a circular cross section. In addition the bars are joined together in a U shape. The bars carry pads with an A-shaped roof to minimize contact with the wet door.

If the bars have a circular cross-section as shown in FIG. 14, then it may be desirable to use A-roofed pads 10 to sharpen the contact surface with the door 6. FIG. 14A provides a close up view of the A-roofed pad 10 that can be snapped on. Clearly, slide-on pads could also be used for the same effect.

Figure 15:
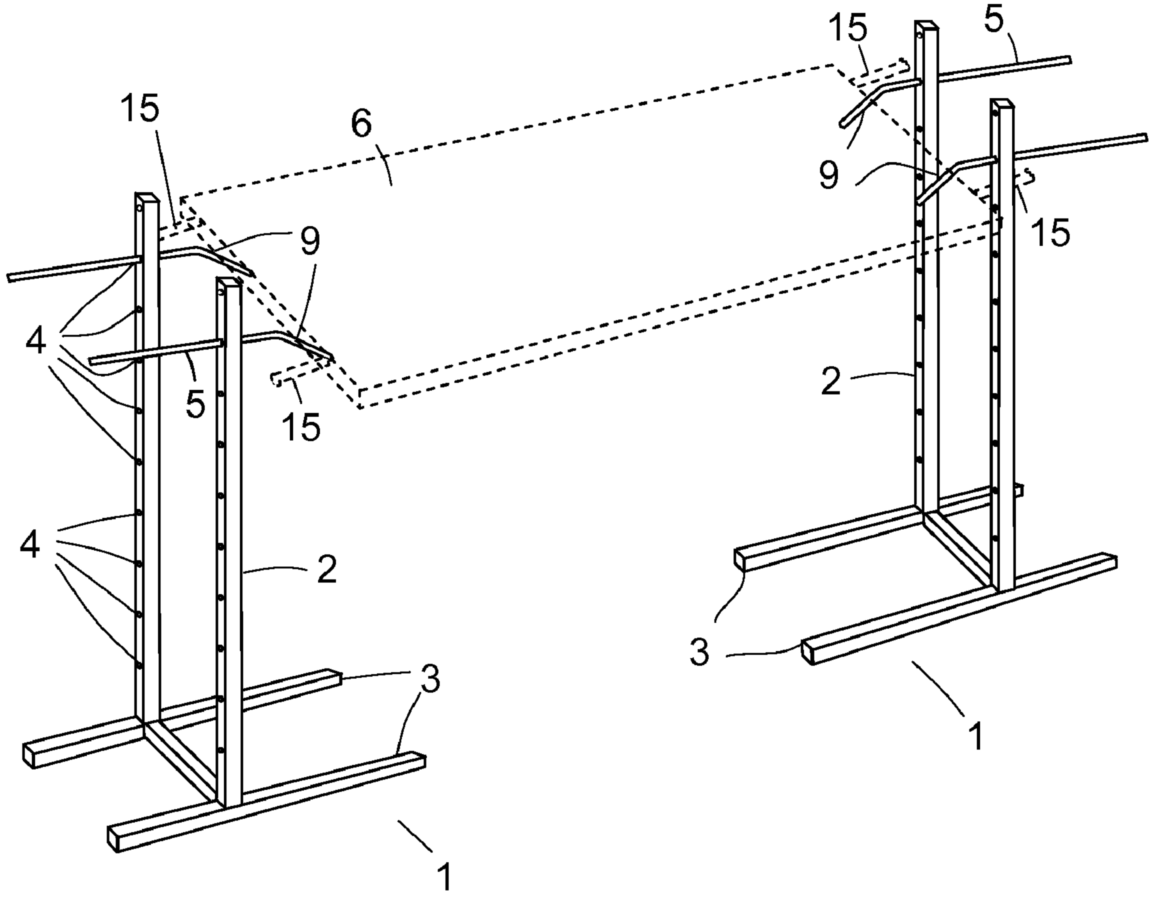
FIG. 15 illustrates the configuration used for drying doors. Bars supporting the door may be inserted at the top level of the rack or at lower levels. The bars traverse the vertical member through horizontal holes but include an inclined segment that supports the door being dried.
Figure 16:
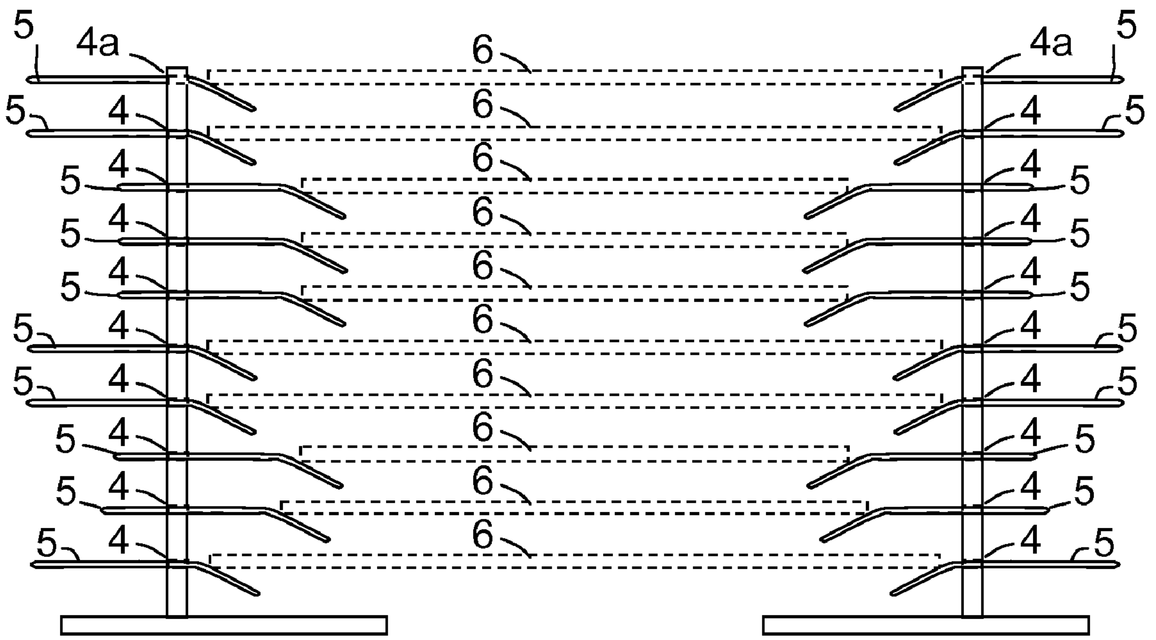
FIG. 16 shows a side view of the device being used to dry a stack of doors.
Figure 17:
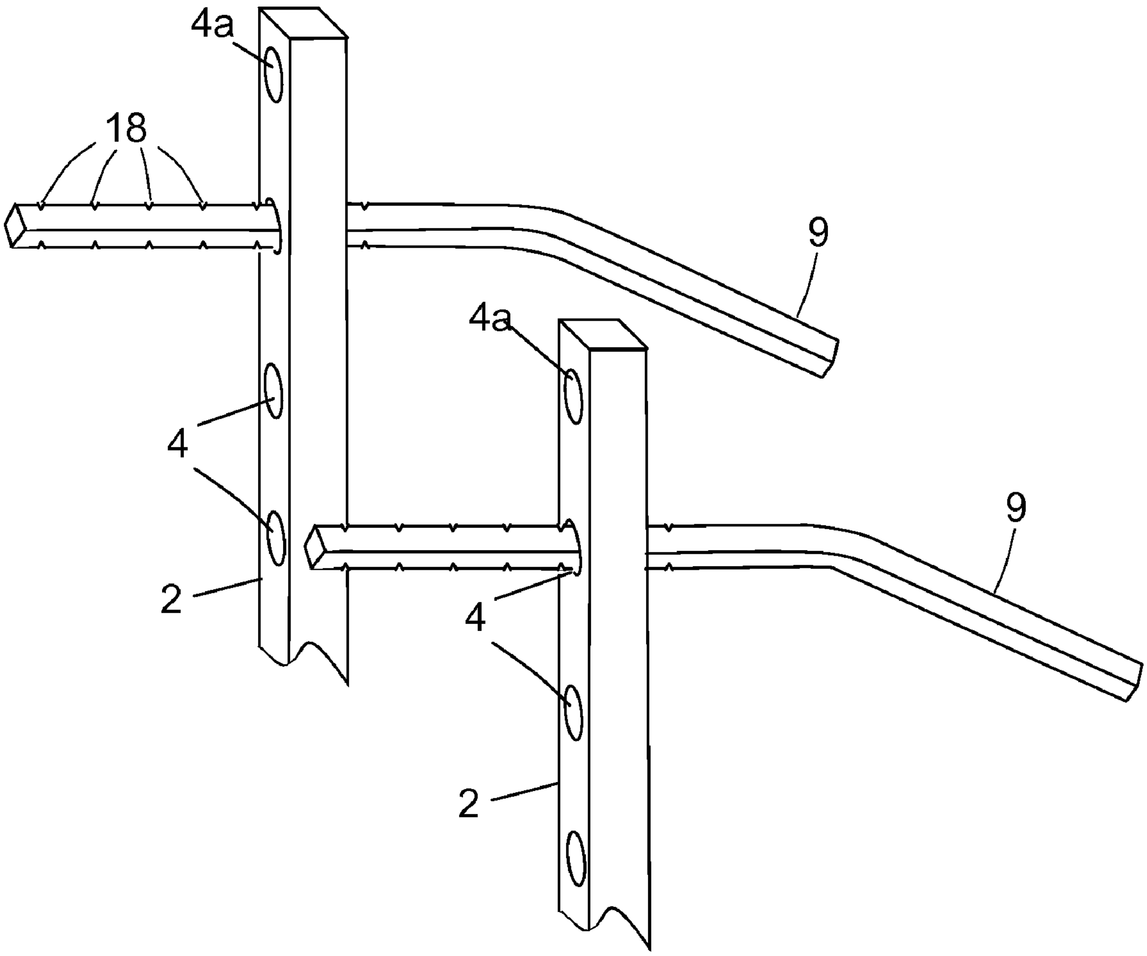
FIG. 17 provides a close up view of the bars used in the drying configuration.

FIG. 15, FIG. 16 and FIG. 17 illustrate the configuration of the painter's rack for doors 6 being dried. As in the spraying task, a wet door needs to be held by the corner of its edges (i.e., at the line where one face of the door meets the edge at a 90 degree angle) to ensure that the wet paint is not marred by the supporting surfaces. To this goal it is advantageous to use the segments 9 of the bars which are slanted from the horizontal. FIG. 16 shows a side view of a stack of doors with different dimensions, being dried. FIG. 17 provides a detailed view of the bars.

Because the holes 4 through which the bars 5 traverse the vertical members 2 are horizontal, the bars can be adjusted to support doors 6 of different sizes as shown in FIG. 16. To accommodate such doors, the bars 5 are inserted into the openings 4 in different amounts as needed to support the doors 6. The indentations 18 can be used to lock the bars in place. This can be done because the vertical members 2 are in the shape of a tube with a square cross-section, and the indentations can fit over the wall of the tube.

Figure 18A:
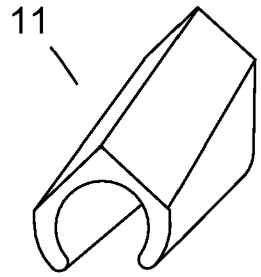
FIG. 18A shows a snap-on pad with an A-shaped roof slanting along its axis.
Figure 18B:
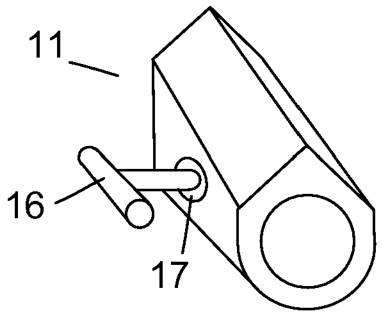
FIG. 18B show a slide-on pad with an A-shaped roof slanting along its axis. The pad is equipped with a butterfly lock device to prevent it from sliding.
Figure 18:
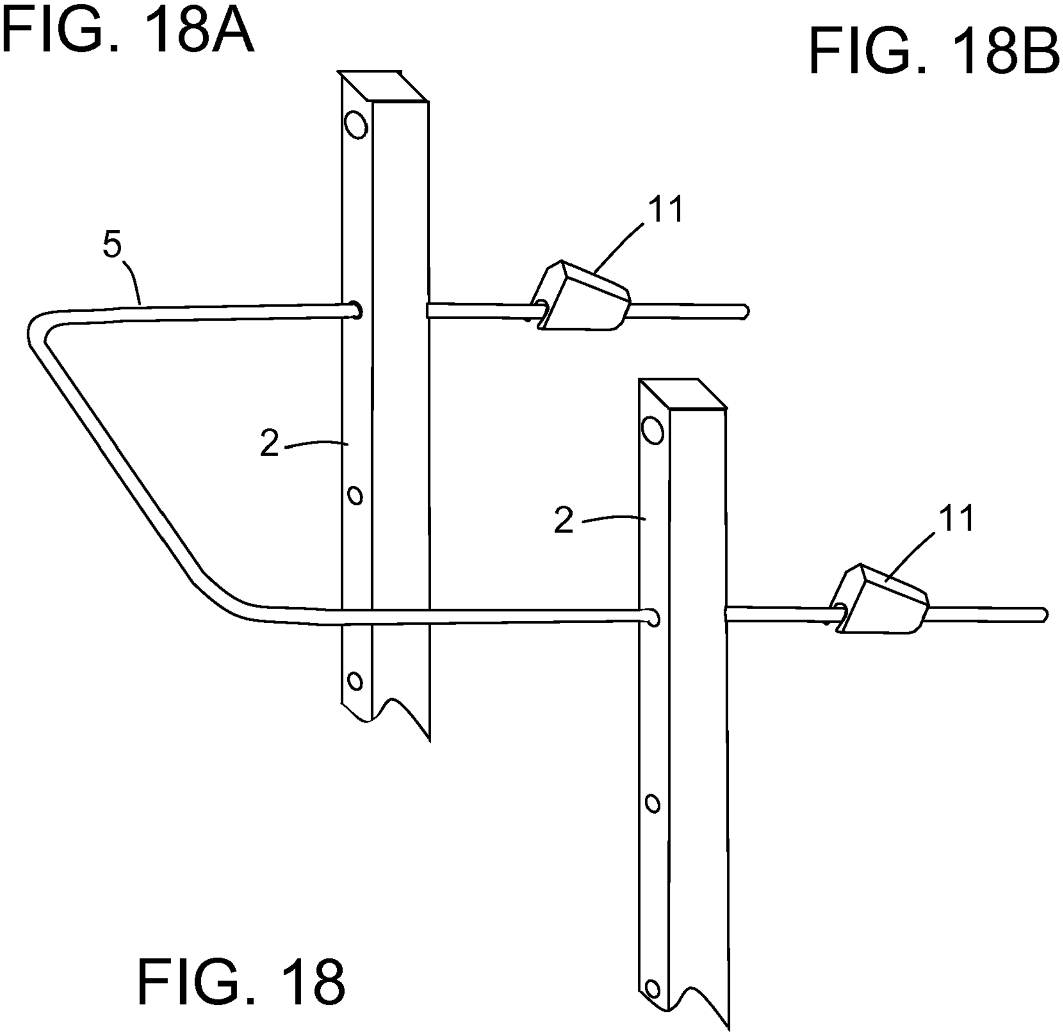
FIG. 18 illustrates how bars with a circular cross section and equipped with A-roofed pads can be used to support a drying door.

Many variations in the above designs are possible. For example, as shown in FIG. 18, the bars need not deviate from the horizontal. Instead, A-roofed pads shown in FIGS. 18A and 18B with a slope along their axis could be employed with U-shaped bars. In addition, pads 11 could be designed to snap on or to slide on the bars 5. The slope angle for these pads could range from 10 degrees to 45 degrees from the horizontal. It should be steep enough to minimize contact surface yet not too steep that the door slips down the slope. Preferably it should range from 20 degrees to 30 degrees.

Rubber pads 8 and 10 and 11 mounted on the bars to protect the door finish may slip during prepping, spraying and drying. It may therefore be desirable, as an option, to include a locking mechanism on the pads. As shown in FIG. 18B the pad 11 includes a locking mechanism that can take the form of a butterfly screw 16 anchored in a hard plastic (for example nylon) threaded sleeve 17 embedded in the rubber pad. The same arrangement can be utilized for the flat-top pads and the A-roofed pads.

Figure 19:
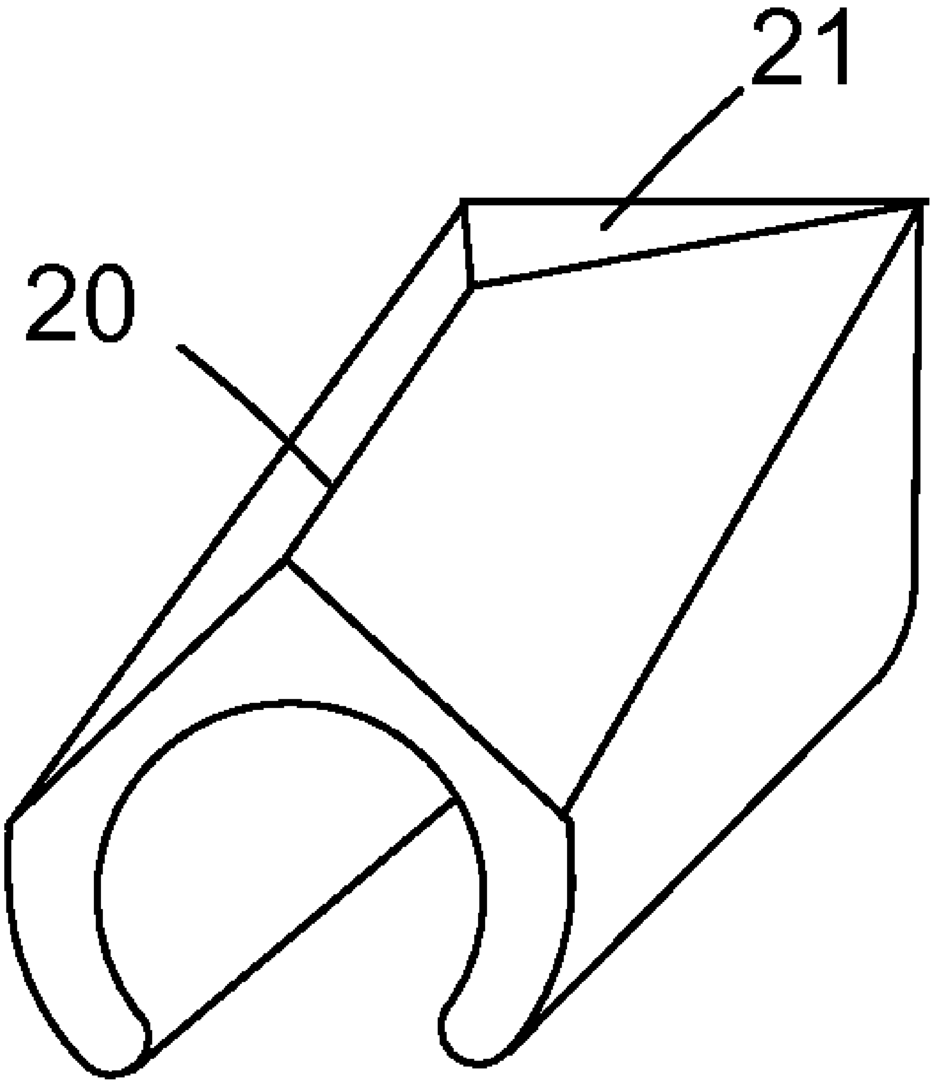
FIG. 19 illustrates how a general purpose pad could be constructed with a flat top and with an A-roof edge inclined along its axis. This pad could be used with straight bars for prepping doors as well as for spraying or drying doors.

FIG. 19 illustrates a pad which can be used for the sanding work as well as for spraying and drying: it includes an A-shaped roof 20 slanted along its axis to minimize contact with the door during drying. It also comprises a flat-top 21 to provide a strong supporting surface for sanding and spraying.

Figure 20:
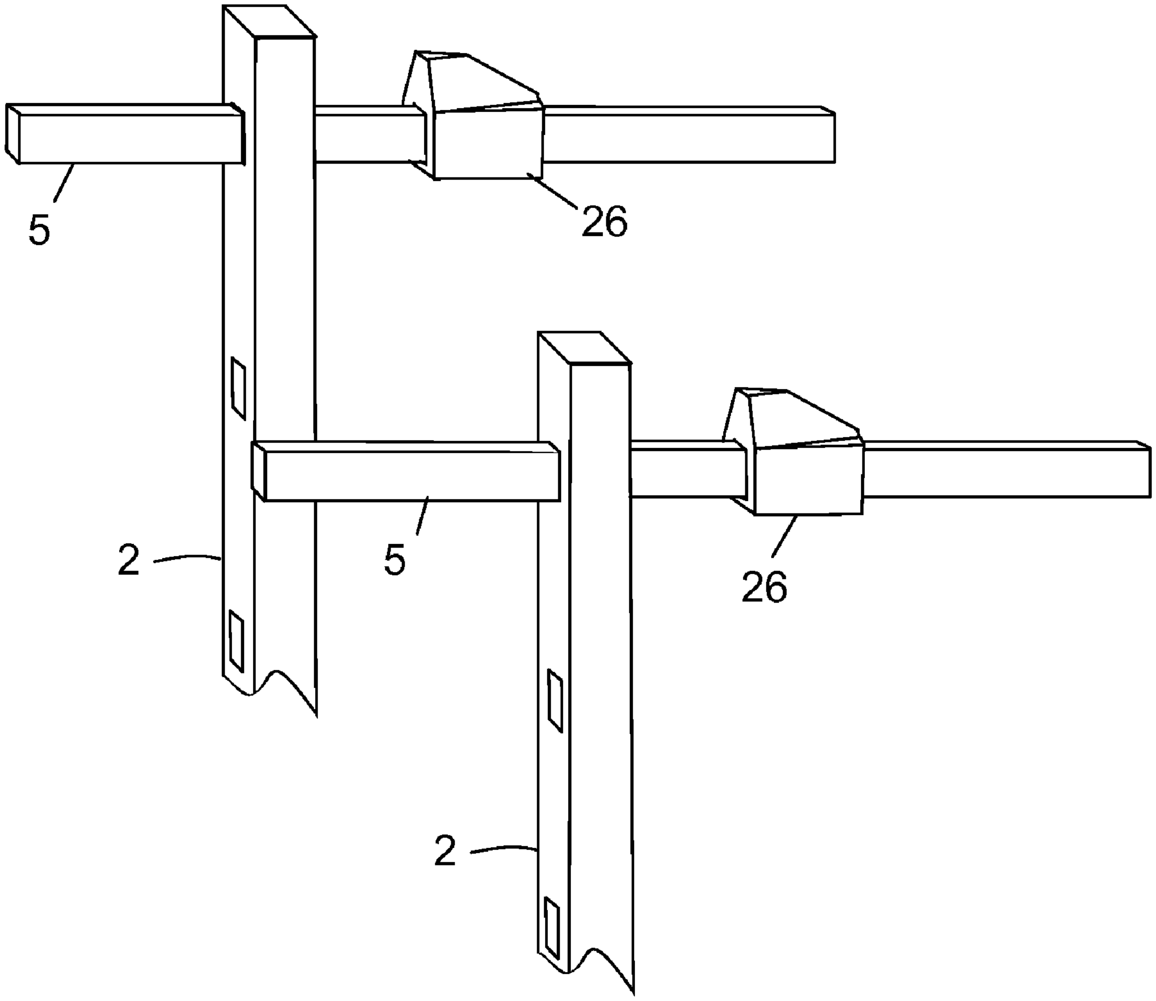
FIG. 20 shows how the top bars can be strengthened by having a rectangular cross-section. Optional pads must also be configured to fit such bars and must have an A-roof shape inclined along their axis and truncated at the top to provide a flat surface.

The weight and cost of the painter's rack can be minimized by reducing the amount of material used in its construction. This can be done without weakening its structural strength by using bars 5 with a rectangular cross section as shown in FIG. 20. Pads 26 can be configured to slide on the bar to minimize contact with doors.

The use of bars 5 with a square cross-section may present a problem when the corner of the square faces upward. If this corner is a very well defined square angle, a sharp edge is generated along the bar. This sharp edge may dent the door resting on it depending on the hardness of the wood and on the weight of the door. It may then be necessary to soften the sharpness of this edge. For example slightly rounding off the edge to a curvature ranging from 0.005 inch to 0.020 inch may be sufficient to reduce the denting of the door while still minimizing the area of contact between the bar and the door's wet paint. Hard wood require less of a curvature than soft wood.

Figure 21:
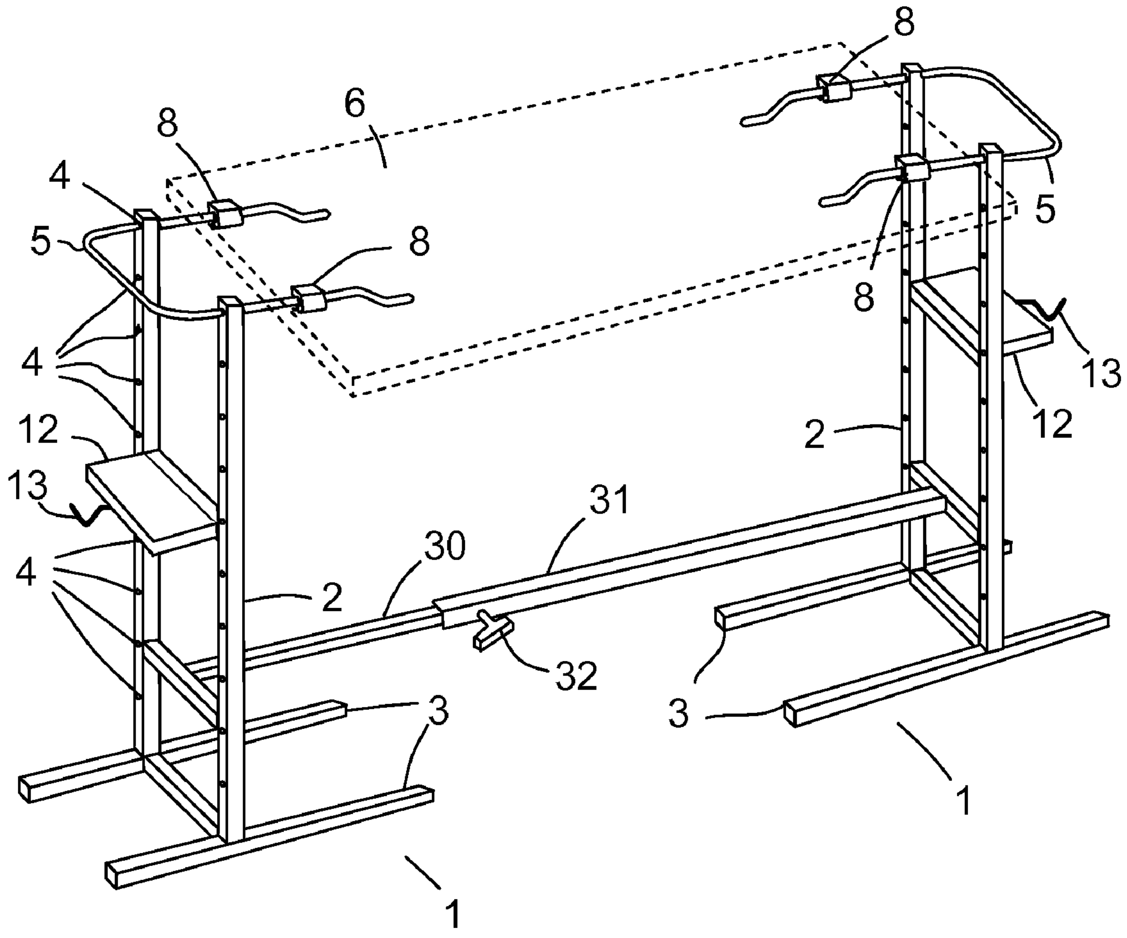
FIG. 21 illustrates the rack system in which a horizontal telescopic bar joins the two racks to prevent the racks from separating from each other when they are carrying a load.

Several other alternatives are possible to strengthen the rack structure. For example as shown in FIG. 21, the two supporting structures 1 can be joined by two telescopic bars 30 sand 31. The length of the telescopic bars can be adjusted and they can be locked by means such as a butterfly screw 32, to prevent the supporting structures from sliding apart when they carry a load.

Figure 22:
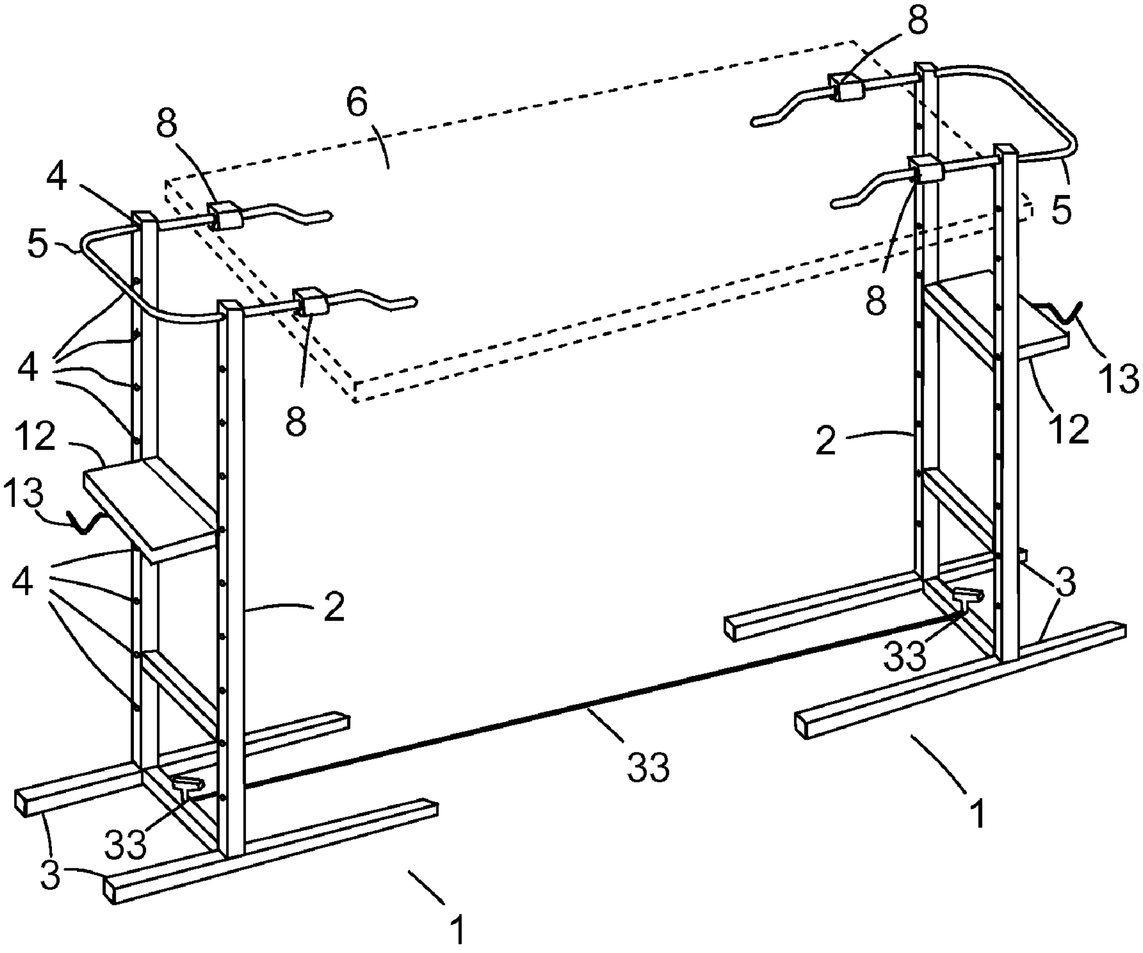
FIG. 22 illustrates the rack system in which a cable with an adjustable length joins the two racks to prevent the racks from separating from each other when they are carrying a load.

Alternatively, as shown in FIG. 22 a cable 33 can join the supporting structures to ensure that they do not slide apart. The length of the cable can be adjusted by means of a locking device such as a clamp 34 to accommodate doors of different sizes.

Bars 5 on the top level of the vertical members 2, which are used to support a door 6 being prepped or sprayed, can be made more sturdy than the ones below which support doors 6 being dried. This increased sturdiness can be implemented, for example, by increasing the cross-section of the bars at the top level. Consequently, the holes 4*a* at the top of the vertical supports 2 should be made correspondingly larger then the holes 4 at the lower levels. Alternatively, all bars 5 could have the same external dimension in their cross-section with the bars at the lower level constructed with hollow tubes to bestow them with lighter weight and the bar 5 at the top with solid rods to provide them with greater strength. All the holes 4 and 4*a* through the vertical members 2 can then be exactly the same.

Figure 23:
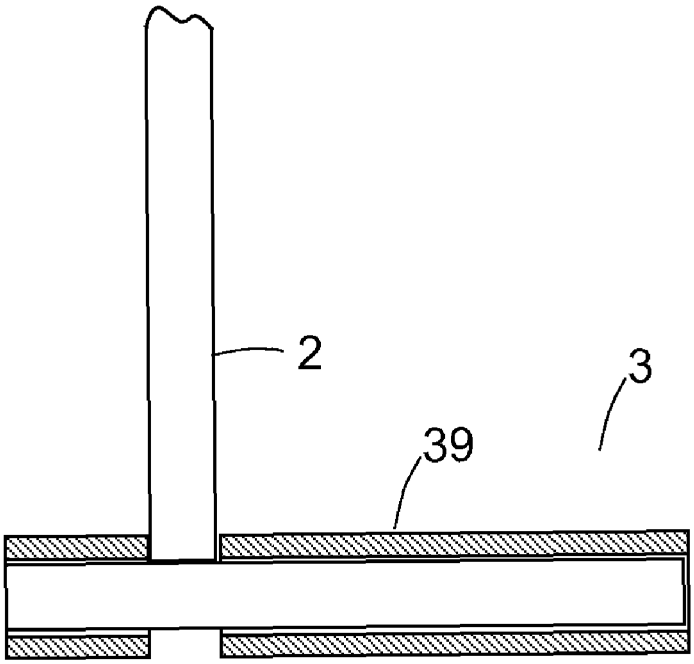
FIG. 23 shows how the feet of the rack could be made telescopic. This figure shows the feet in the retracted position.
Figure 23A:
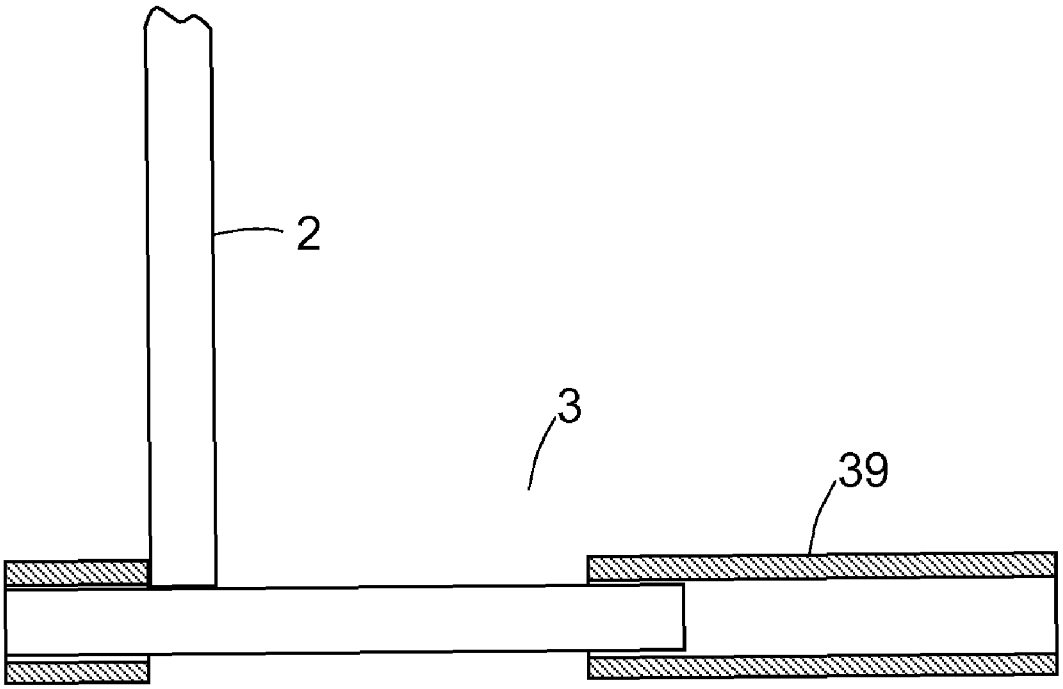
FIG. 23A shows how the feet of the rack could be made telescopic. This figure shows the feet in the extended position.

As shown in FIGS. 23 and 23A the base 3 supporting the vertical members 2 can be constructed using telescoping tubes to allow the workers to extend it to provide more stability as the need arises. FIG. 23 shows the base in the most compact state with the telescoping tubes 39 retracted, and FIG. 23A shows the base in the most stable state with the telescoping tubes 39 extended.

Figure 24:
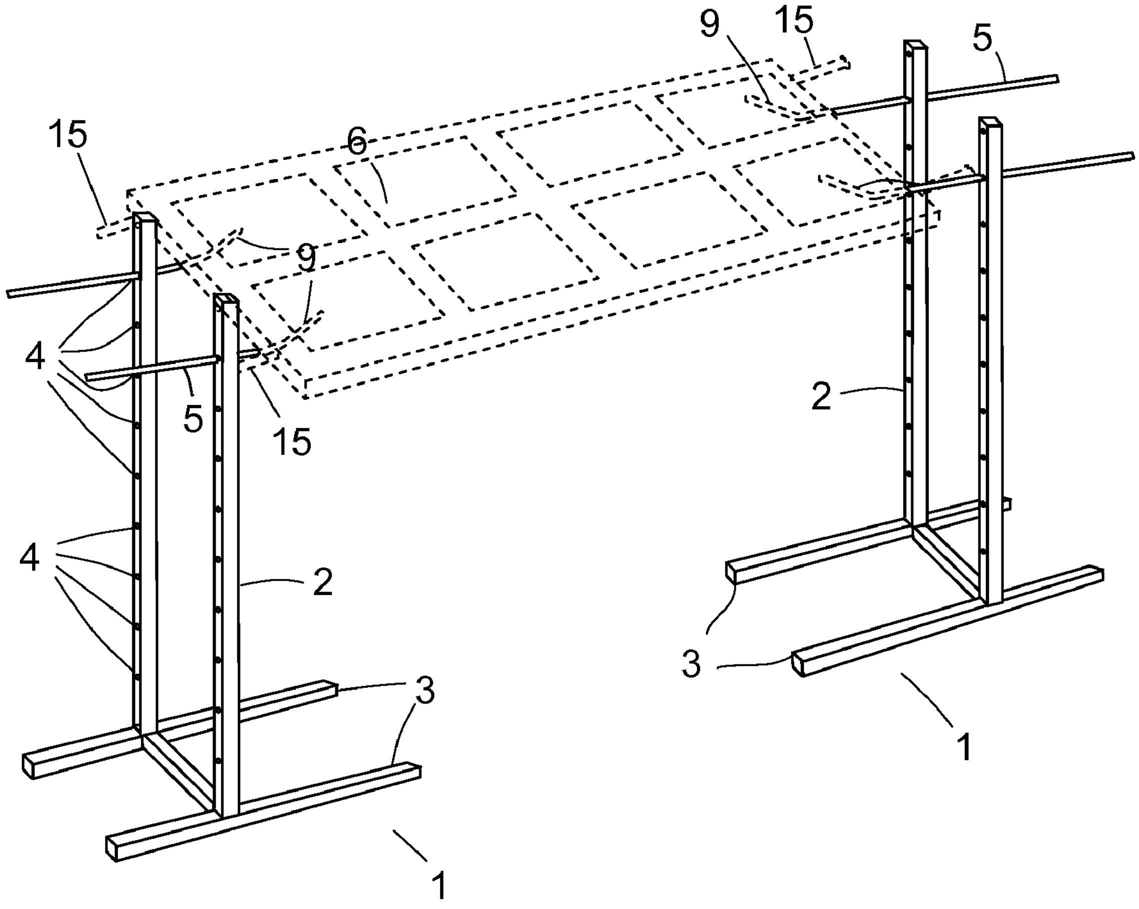
FIG. 24 illustrates how support bars can be turned upward to support a door using locations on the door, such as glass panes, untouched by paint.

FIG. 24 illustrates a variation in the utilization of the invention. The bars 5 are inserted into the vertical members 2 such that the bar segments 9 point upward. This configuration can be of use when the object which is being worked on, includes areas not to be painted. For example a French door may include glass panes which should be left unpainted. The upwardly pointed bars 5 can then be placed in contact with these areas to support the object as shown in the FIG. 24.

Figure 25:
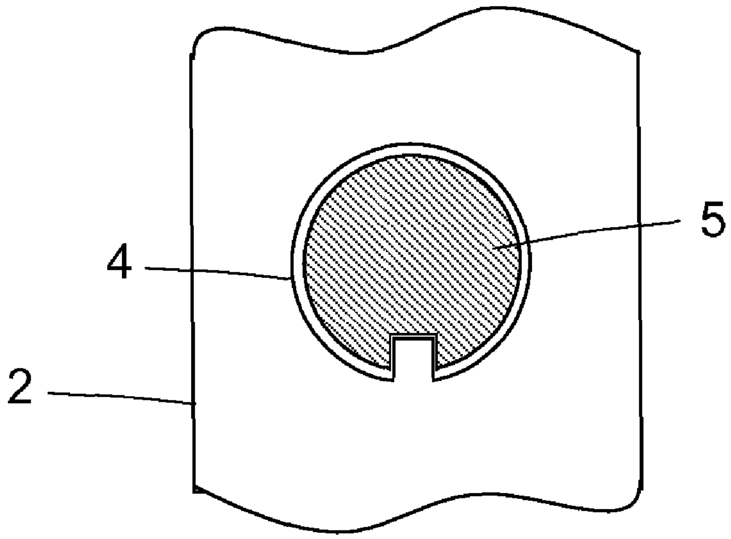
FIG. 25 shows how a support bar can be keyed to prevent the bar from rotating during use.
Figure 25A:
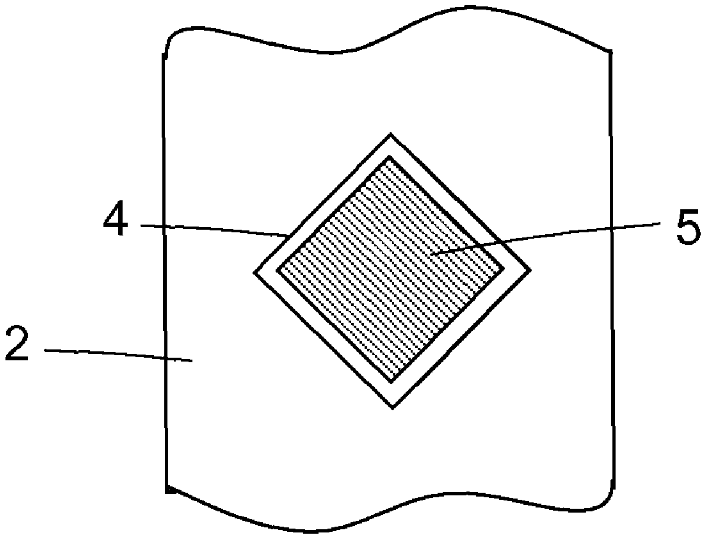
FIG. 25*a* shows how a support bar can be given in a non-circular cross section, for example in a square cross-section to prevent the bar from rotating during use.
Figure 26:
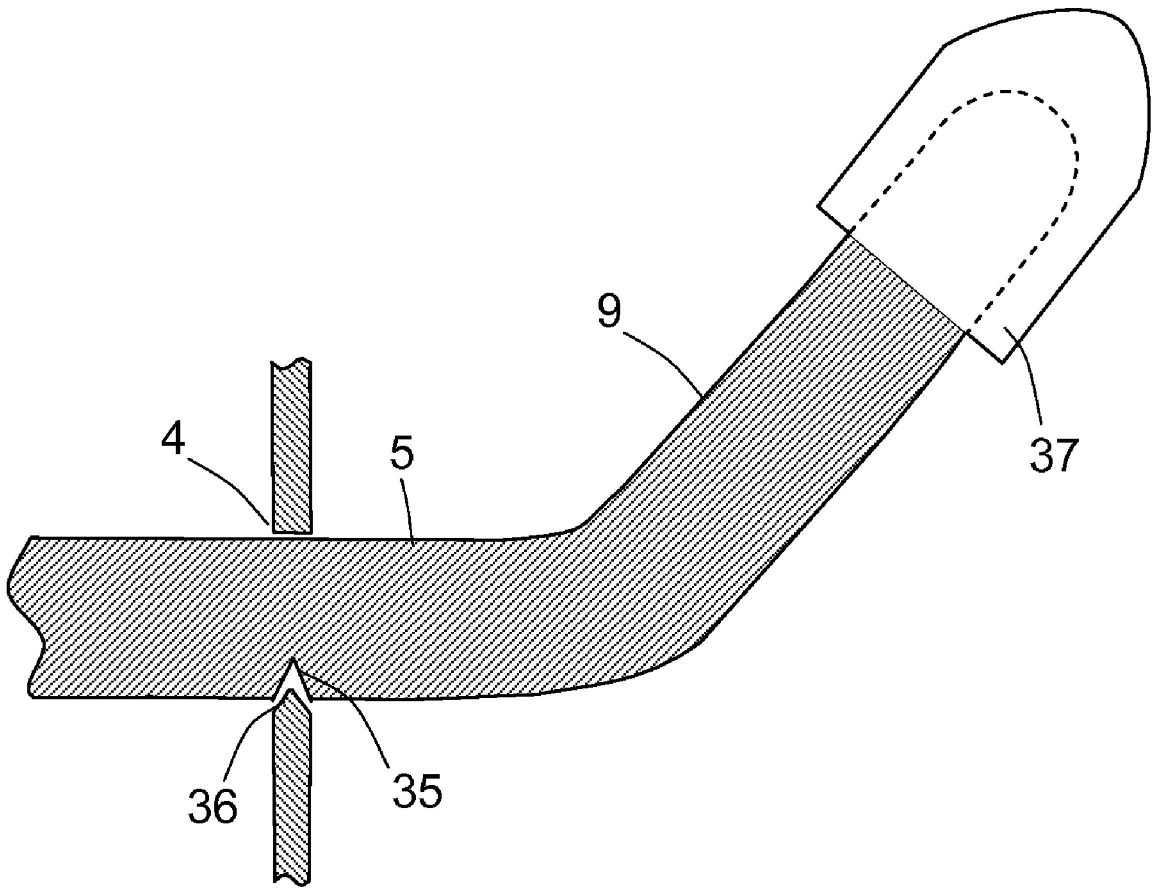

Bars 5 with upwardly directed segments 9 as shown in FIG. 25 can inadvertently rotate down around their axis when a torque is applied on them unless special precautions are taken. As is evident to someone versed in the art many design configurations can be used to prevent their rotation. A few such configurations are illustrated in FIG. 25, FIG. 25*a* and FIG. 26. In FIG. 25 the rotation of the bar 5 is prevented by forming the opening 4 in a keyhole shape, and bar 5 with the cross-section of a key. FIG. 26 shows that the same result can be achieved by forming the opening 4 and the cross-section of bar 5 in the shape of a square. Yet another approach relies on a V-shaped groove 35 cut tangentially to bar 5 and a wedge shaped edge 36 to the opening 4. Friction between the wedge 36 and the groove 35 can prevent bar 5 from rotating. Optionally rubber pads 37 can be placed on the segments 9 to prevent damage to the object 6 being worked on.

Figure 27:
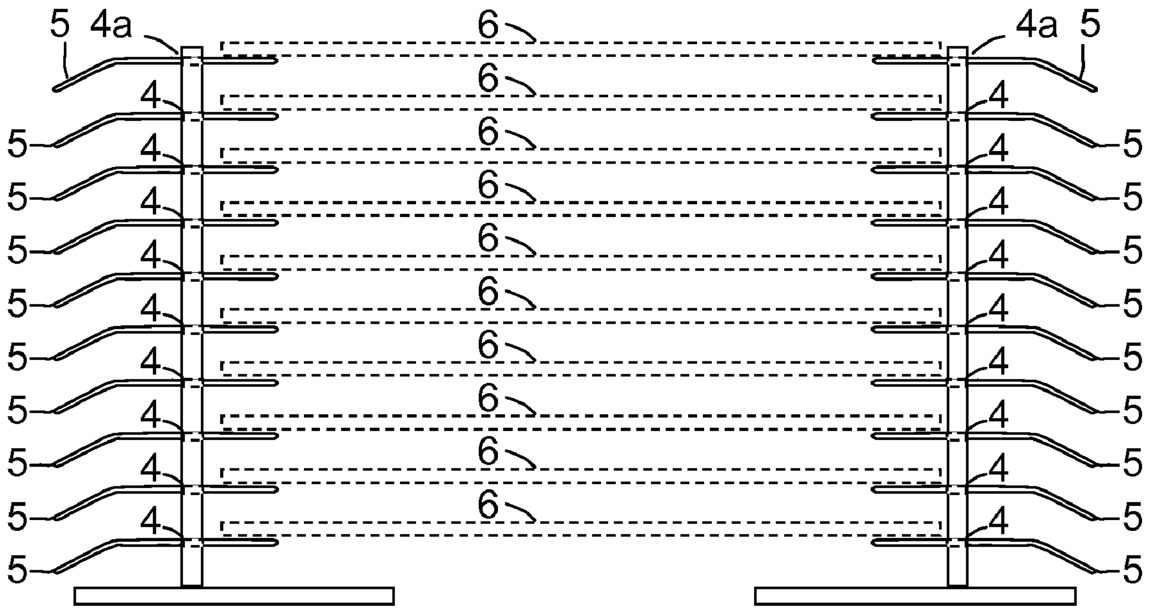
FIG. 27 shows how the support bars can be inserted into the vertical support members such that their horizontal segment faces inward, thus allowing an object to be supported by its surface rather than by its edges.

FIG. 27 shows how the bars 5 can be reversed with the slanted segment 9 on the outside and the horizontal segment on the inside to provide a horizontal supporting structure to an object 6 to be painted or worked on.

Even though the bars 5 can be slidably mounted on the vertical supports 2, it is possible to weld them in place to provide a more sturdy structure. In particular the bars mounted at the top level, which support a door being prepped, may benefit the most from being firmly welded in place.

The painter's rack described in this invention can be sold as a kit which can be assembled to optimize execution of the particular task at hand. For example, if the rack is to be used for prepping, then the configuration shown in FIG. 3, FIG. 4 and FIG. 5 could be assembled. If the rack is to be used for spraying, then the configuration shown in FIG. 9, FIG. 10 and FIG. 11. could be used. If the rack is to be used for drying, then the configuration in FIG. 15, FIG. 16 and FIG. 17 could be employed. It is clear that one of the advantages of this invention is its efficiency in that the same parts can be used for the different tasks of prepping, spraying and drying.

Utilization of the Painter's Rack: On a typical work area many doors need to be worked on simultaneously. To that effect, several racks are used. One rack could be used for prepping doors, another rack system for spraying doors and a third one for drying doors. It is also possible to use one rack for prepping and prepping and a second one for drying. It is important that these racks be spatially separated to prevent sawdust from coming in contact with wet paint on the doors and to prevent doors on a drying rack from being inadvertently sprayed on. Therefore, in the course of processing a door, it is preferable to be able to move the door from one site to another, for example from the prepping site to the spraying site to the drying site; or if only two sites are used, from the prepping/spraying site to the drying site.

To avoid having to touch the doors during this manipulation, before work on the doors begins, holding anchors 15 are screwed on the edges of doors as shown in FIG. 3 FIG. 9 and FIG. 15. Because of their small surface area, and their location on the edges of the doors, these anchors do not disturb prepping and spraying, and do not affect the surface paint finish.

When such holding anchors 15 are affixed on small cabinet doors, the distance between two adjacent anchors 15 on the same edge may be smaller than the distance between two vertical members 2 on a supporting structure 1 because of the small size of the doors 6. Since the doors 6 to be dried are deposited in a stack on the rack as shown in FIG. 16, it is important to allow access to the anchors 15 and passage of the painter's arms between the two vertical members 2. For this reason, it is preferable in a rack configured for drying not to put any joining implement such as the work platform 12 shown in FIG. 3 and 19, between the two vertical members. As shown in FIG. 15 there is no such joining implement between the two vertical members in a drying rack configuration used for small cabinet doors. The rack configuration used for prepping, which requires the sturdiest rack configuration, can be strengthened by joining the two vertical members for example with a platform support 12. Since doors are not stacked during prepping, the presence of the work platform 12 is acceptable.

An advantage to having U-shaped bars is that the separation between bars on opposite racks can easily be adjusted in one single step. In contrast, systems that use independent bars require more adjusting time: each bar needs to be adjusted independently. On the other hand, independent bars not joined together in a U allow pads to be slipped on over the straight segment without having to go through any bend.

Doors 6 stacked on a rack should be kept away from the sawdust of prepping work and the spray paint. Therefore, in general, the top level of a fully loaded rack should not be used for prepping or drying doors 6. However, certain door finishing activities such as roll painting or dyeing do not generate significant aerosols. In such cases it may be possible to use the top level of a rack for these activities and to load the lower levels with drying doors. A shield made of material such as cardboard or plywood may be placed on the second level of the racks, reserving the first level for prepping and the lower levels (third and below) for drying doors 6. As a further precaution against unwanted aerosols, it may be possible to hang a plastic sheet around the shield to protect the doors stacked on the lower levels.

An important aspect of this invention is that the same hardware can be used to perform prepping, painting and drying. More specifically prepping requires a) inserting bars in the top openings of each supporting member;

b) placing the door horizontally on top of the bars such that the door reposes on the horizontal first segments of the bars. In this position, the door presents its first side on top and its second side on the bottom;

c) working on the first side of the door;

d) flipping the door, thereby placing the bottom side on top; and e) working on the second side of said door;

Painting a door comprises:

a) inserting bars in the top openings of each supporting member;

b) placing the door horizontally on top of the bars such that the door reposes on the slanted second segments of the bars. In this position the door presents its first side on top and its second side on the bottom;

c) coating the first side of the door with paint;

d) flipping the door, thereby placing the bottom side on top; and e) coating the second side of the door with paint; and Drying at least one door comprises:

a) inserting bars in all said openings;

b) placing the door horizontally on top of the lowest bars such that the door reposes on the slanted second segment of the lowest bars. The lowest said bars are now occupied, all other bars being unoccupied;

c) if additional doors are available, they are placed horizontally on top of the lowest unoccupied bars such that the door reposes on the slanted second segment of the lowest unoccupied bars;

d) repeating the previous step for additional doors until the rack is filled or no more additional door is available; and e) allowing the doors on the rack to dry.

While the above description contains many specificities, the reader should not construe these as limitations on the scope of the invention, but merely as exemplifications of preferred embodiments thereof. Those skilled in the art will envision many other possible variations within its scope. Accordingly, the reader is requested to determine the scope of the invention by the appended claims and their legal equivalents, and not by the examples which have been given.

I claim:

1. A painter rack for supporting in a horizontal position, at least one door undergoing painting related work, said work including prepping, painting or drying, said painter rack comprising:

a) two support structures, dubbed a left support structure and a right support structure, said left support structure positioned on left side of, and said right support structure positioned on right side of, said at least one door, each support structure comprising:

i) two vertical members dubbed a first vertical member and a second vertical member, each said vertical member traversed horizontally by a number of openings, said openings forming a vertical array along each said vertical member, each said opening in said first vertical member correspondingly located at essentially the same level as, and forming a pair with, one said opening in said second vertical member;

ii) a number of bars in a multiple of two, said bars assigned in pairs to traverse said opening pairs, said bars used to support said at least one door, said bars comprising at least two segments, (1) first said segment traversing slidably and horizontally its assigned said openings in each said opening pair; and (2) second said segment being bent with respect to first said segment; and iii) two base structures, each of said base structures supporting one of two said supporting structures;

whereby said at least one door can be supported by said bars by individually sliding said bars through said openings to adjust the position of said bars according to the dimensions of said at least one door.

2. The painter rack as in claim 1 further comprising rubber pads mounted on said bars.

3. The painter rack of claim 1 wherein indentations are cut into said bars thereby preventing said bars from sliding through said openings.

4. The painter rack of claim 1 wherein said openings are not circular and are essentially matched in shape with the cross-section of said bars with sufficient clearance between said openings and said bars to allow said bars to slide snugly but not to rotate.

5. The painter rack as in claim 1 wherein said first segment of said two bars in each said bar pairs are extended, bent and joined together, whereby said two bars in said bar pairs are essentially transformed into a single U shape object.

6. The painter rack as in claim 1 wherein a platform is mounted on at least one of said support structures, said platform being held essentially horizontally between said support structure's two said vertical members.

7. The painter rack as in claim 1 wherein a hook is mounted on at least one of said support structure.

8. The painter rack of claim 1 wherein said bars comprise three segments wherein third segment is parallel with said first segment, thereby giving said bars the shape of an elongated Z with obtuse angles.

9. The painter rack system as in claim 1 wherein said second segment is bent with respect to said first segment, at an angle between 10 degrees and 45 degrees from the horizontal.

10. The painter rack system as in claim 1 wherein said second segment is bent with respect to said first segment, at an angle between 20 degrees and 30 degrees from the horizontal.

11. The painter rack as in claim 1 wherein the shape of the cross-section of said bars is selected from the group consisting of circle, elliptical, square, rectangle, triangular, and diamond.

12. The painter rack as in claim 1 wherein said bars comprise on their upper surface an edge with a curvature ranging from 0.005 inches to 0.020 inches.

13. The painter rack as in claim 1 further comprising A-roofed pads configured to be snapped on said bars.

14. The painter rack as in claim 1 further comprising at least one telescoping tube joining said base structures.

15. The painter rack as in claim 1 further comprising at least one cable joining said base structures.

16. The painter rack as in claim 1 wherein said second segments are slanted downward whereby it can support said at least one door.

17. The painter rack as in claim 1 wherein said second segments are slanted upward whereby it can support said at least one door.

18. The painter rack as in claim 1 wherein said painting related work is further restricted to prepping or painting, and said at least one door is further restricted to one single door, and said single door is supported by said first segments.

19. The painter rack as in claim 1 wherein said bars are welded in place.

20. A method of painting a predetermined door using said painter rack of claim 1 comprising:

a) prepping said predetermined door, said prepping comprising the steps of:
i) inserting said bars in top said openings of each said supporting member;
ii) sliding said bars is said openings to conform to the dimensions of said predetermined door;
iii) placing said predetermined door horizontally on top of said bars such that said predetermined door reposes on the horizontal said first segments of said bars, said horizontal predetermined door presenting its first side on top and its second side on the bottom;
iv) working on said first side of said predetermined door;
v) flipping said predetermined door, thereby placing bottom side on top; and
vi) working on said second side of said predetermined door;

b) painting said predetermined door, said painting comprising the steps of:
i) inserting said bars in top said openings of each said supporting member;
ii) sliding said bars is said openings to conform to the dimensions of said predetermined door;
iii) placing said predetermined door horizontally on top of said bars such that said predetermined door reposes on the slanted said second segments of said bars, said horizontal predetermined door presenting its first side on top and its second side on the bottom;
iv) coating said first side of said predetermined door with paint;
v) flipping said predetermined door, thereby placing bottom side on top; and
vi) coating said second side of said predetermined door with paint; and c) drying said predetermined door, said drying comprising the steps of:
i) inserting said bars in all said openings of each said supporting member;
ii) sliding said bars is said openings to conform to the dimensions of said predetermined door;
iii) placing said predetermined door horizontally on top of the lowest said bars such that said predetermined door reposes on the slanted said second segment of said lowest bars, lowest said bars now becoming occupied, all other said bars being unoccupied;
iv) if an additional door is available, sliding the lowest said unoccupied bars in said openings to conform to the dimensions of said additional door;
v) placing said additional door horizontally on top of said lowest unoccupied bars such that said additional door reposes on the slanted said second segment of said lowest unoccupied bars, said lowest unoccupied bars now becoming occupied;
vi) repeating previous two steps for any said additional door until said rack is filled or no more said additional door is available; and
vii) allowing said doors on said rack to dry.

* * * * *